United States Patent [19]
Waymouth et al.

[11] Patent Number: 5,969,070
[45] Date of Patent: Oct. 19, 1999

[54] THERMOPLASTIC ELASTOMERIC OLEFIN POLYMERS

[75] Inventors: Robert M. Waymouth, Palo Alto, Calif.; Elisabeth Hauptman, Wilmington, Del.; Geoffrey W. Coates, Palo Alto, Calif.

[73] Assignee: The Board of Trustees of the Leland Stanford Junior University, Palo Alto, Calif.

[21] Appl. No.: 08/702,440

[22] PCT Filed: Mar. 24, 1995

[86] PCT No.: PCT/US95/03597

§ 371 Date: Dec. 20, 1996

§ 102(e) Date: Dec. 20, 1996

[87] PCT Pub. No.: WO95/25757

PCT Pub. Date: Sep. 28, 1995

Related U.S. Application Data

[63] Continuation-in-part of application No. 08/218,210, Mar. 24, 1994, Pat. No. 5,594,080.

[51] Int. Cl.⁶ ..................................................... C08F 10/06
[52] U.S. Cl. .................. 526/351; 526/348.2; 526/348.3; 526/348.6; 526/348; 526/160; 526/943; 502/117
[58] Field of Search ................................ 526/351, 348.4, 526/348.6, 348.3, 348.2, 348, 160, 943

[56] References Cited

U.S. PATENT DOCUMENTS

| | | | |
|---|---|---|---|
| 4,522,982 | 6/1985 | Ewen | 525/240 |
| 4,874,880 | 10/1989 | Miya et al. | |
| 5,120,867 | 6/1992 | Welborn, Jr. | |
| 5,218,064 | 6/1993 | Yasuda et al. | |
| 5,279,999 | 1/1994 | Deboer et al. | |
| 5,304,614 | 4/1994 | Winter et al. | |
| 5,385,877 | 1/1995 | Fujita et al. | |
| 5,391,661 | 2/1995 | Naganuma et al. | |
| 5,504,169 | 4/1996 | Canich | 526/127 |
| 5,646,322 | 7/1997 | Van Beek | 556/11 |

FOREIGN PATENT DOCUMENTS

WO 96/20225 7/1996 WIPO.

OTHER PUBLICATIONS

Gauthier et al. Elastomeric Poly(propylene): Influence of Catalyst Structure and Polymerization Conditions on Polymer Structure and Properties, Macromolecules 1995, 28, 3771–3778.

Tsvetkova et al., Synthesis of Elastomeric Polypropynlene in Bulk Using The $(2-Phlnd)_2ZrCl_2$ Homogenous Catalyst, Polymer Science, Series A, vol. 39, No. 3 (1997), 235–240.

Hauptman and Waymouth, Stereoblock Polypropylene: Ligand Effects on Stereospecificity of 2–Arylindene Zirconocene Catalysts, J. Am. Chem. Socy. 1995, 117, 11586–11587.

McKnight, Masood & Waymouth, Selectivity in Propylene Polymerization with Group 4–Cp–Amido Catalysts, Organometallics, 1997, 16, 2879–2885.

*Primary Examiner*—Mark Nagumo
*Attorney, Agent, or Firm*—Jacques M. Dulin, Esq.; Heller, Ehrman, White & McAuliffe

[57] ABSTRACT

Novel elastomeric alpha olefin polymers of homogeneous composition formed from linear or branched chain $C_3$–$C_{10}$ monomers such as propylene, 1-butene, 1-pentene, 4-methyl-1-pentene, 1-hexene and mixtures thereof, comprising alternating isotactic and atactic disastereosequences in which all polymer fractions have similar molecular weight distributions, $M_W/M_n$, of less than 7, an isotactic Block Index greater than about 5, an isotactic pentad, mmmm, content of between 9 and 71%, an average molecular weight, Mw, from about 20,000 to about 1,350,000, a melting point of above 70° C., and which polymers are elastomeric in exhibiting a positive power of recovery of elongation above 100%. Examples include thermoplastic elastomeric polypropylenes having melting points between 70–165° C., which are highly regioregular and have low tensile set of below about 70° at 300% elongation.

21 Claims, 8 Drawing Sheets

THERMOPLASTIC ELASTOMERIC OLEFIN POLYMERS

CROSS REFERENCE TO RELATED APPLICATION

This is a continuation in part of U.S. Ser. No. 08/218,210 filed by us on Mar. 24, 1994, now U.S. Pat. No. 5,594,080 entitled "Thermoplastic Elastomeric Olefin Polymers, Methods of Production and Catalysts Therefor", now U.S. Pat. No. 5,594,080, the benefit of the priority date of which is claimed under 35 USC §119 and §120, and Treaties and PCT Rules.

DESCRIPTION

1. Technical Field

This invention relates to novel catalysts, catalyst systems, methods of production of olefin polymers, and elastomeric olefin polymers, particularly crystalline and amorphous block polymers by use of the novel catalysts of the invention. A principal area of interest is the preparation and use of novel cyclopentadienyl or indenyl metallocene catalysts to produce elastomeric stereoblock polymers, and methods of control of catalyzed polymeric reactions to produce polymers having properties ranging from crystalline thermoplastics to thermoplastic elastomers to amorphous gum elastomers.

2. Background Art

Crystalline, amorphous, and elastic polypropylenes are known. Crystalline polypropylenes are generally regarded as comprising of predominantly isotactic or syndiotactic structures and amorphous polypropylene is regarded as comprising predominantly of an atactic structure. U.S. Pat. No. 3,112,300 and 3,112,301 both of Natta, et. al. describe isotactic and prevailingly isotactic polypropylene.

U.S. Pat. No. 3,175,199 to Natta et al. describes an elastomeric polypropylene which can be fractioned out of a polymer mixture containing prevailingly isotactic and atactic polypropylenes. When separated from the polymer mixture, a fraction of this polymer showed elastomeric properties which were attributed to a stereoblock structure comprising alternating blocks of isotactic and atactic stereosequences.

Previously, the catalysts used to produce stereoblock amorphous crystalline polypropylenes consisted of heterogeneous catalysts comprising titanium or vanadium halides on a support (Natta and Crespi (Montecatini), U.S. Pat. No. 3,175,999, 1965 (*Chem. Abstr*, 1961, 55,14985b); German Patent DD 300,293 of Arnold et al.), or tetralkyl zirconium or titanium on a metal oxide support U.S. Pat. No. 4,335,225 of Collette (du Pont). These heterogeneous catalysts do not consist of single sites, but of multiple sites and thus produce a mixture of polymeric materials which can be fractionated by extraction into suitable solvents. The various fractions typically have different molecular weights and molecular weight distributions and vary in their physical properties.

Metallocene catalysts are capable of polymerizing alpha olefins to atactic, isotactic, or syndiotactic structures. In particular, rigid bridged indenyl metallocenes represented by the general structure A and B are known in the art where M=Ti, Zr, and Hf:

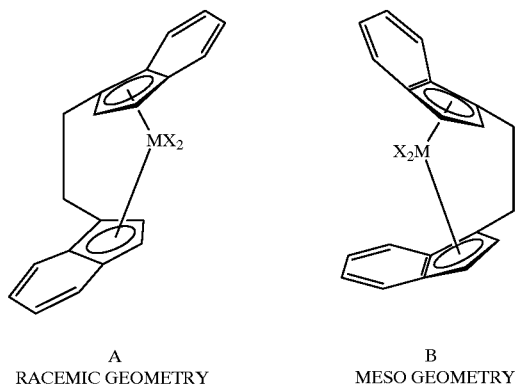

A
RACEMIC GEOMETRY

B
MESO GEOMETRY

As disclosed by Ewen ("Mechanisms of Stereochemical Control in Propylene Polymerizations with Soluble Group 4B Metallocene/Methylalumoxane Catalysts" *J. Am. Chem. Soc.* 1984, 106, 6355–6364), stereorigid catalysts of racemic geometry A produce isotactic polypropylene whereas stereorigid catalysts of meso geometry B produce atactic polypropylene.

A metallocene catalyst was disclosed which yields elastomeric polypropylene Chien, J. C. W.; Llinas, G. H.; Rausch, M. D.; Lin, G. YU.; Winter, H. H.; Atwood, J. L.; Bott, S. G., "Two-state Propagation Mechanism for Propylene Polymerization Catalyzed by rac-[anti-ethylidene (1-$\eta^5$-tetramethylcyclopentadienyl) (1-$\eta^5$- indenyl)] dimethylititanium" *J Am. Chem. Soc.* 1991, 113, 8569–8570; Cheng, H. N.; Babu, G. N.; Newmark, R. A.; Chien, J. C. W., "Consecutive Two-State Statistical Polymerization Models" *Macromolecules* 1992, 25 6980–6987; Lilinas, G. H.; Dong, S. H.; Mallin, D. T.; Rausch, M. D.; Lin, Y. G.; Winter, H. H.; Chien, J. C. W., "Crystalline-amorphous Block Polypropylene and Nonsymmetric ansa-Metallocene Catalyzed Polymerization" *Macromolecules* 1992, 25 1242–1253. This catalyst had rather low activity (3.5×10$^5$ gm polymer/mol Ti.hr) and yielded polypropylenes with molecular weights less than $M_w$=200,000. This polymer was more homogeneous in its composition, and was completely soluble in diethyl ether. Polypropylenes produced with this catalyst had melting points below 70° C., with elongations up to 1300% and tensile strength of 1750 psi.

Accordingly, there is a need for more active catalyst systems, the structure of which can be controlled in the reaction system during polymerization to produce a selected ratio of atactic/isotactic stereosequences, resulting in high molecular weight polymers with narrow molecular weight distributions having preselected properties, including thermoplastic elastomeric properties.

THE INVENTION

DISCLOSURE OF INVENTION

OBJECTS AND ADVANTAGES

It is an object and advantage of this invention to provide a new class of metallocene catalysts, and methods of polymerization employing the catalysts to produce a wide range of alpha olefin polymers, including isotactic-atactic stereoblock polymers having a broad range of structures, including isotactic stereosequences of varying lengths to provide a preselected range of properties, including highly elastomeric thermoplastic properties.

It is another object and advantage of this invention to provide stereoblock alpha olefin polymers with preselected properties by control of catalyst substituents and process conditions.

It is another object and advantage of this invention to provide processes for preparation of a wide variety of stereoblock polymers through control of the catalyst geometry.

It is another object and advantage of this invention to provide a novel class of polymer systems, including stereoblock polymers having preselected properties.

It is another object and advantage of this invention to provide a novel class of high molecular weight atactic polypropylenes.

Still other objects and advantages of the invention will be evident from the Descriptions, Drawings, and Claims of this pplication.

SUMMARY

This invention is directed to novel metallocene-complex atalysts the structure and activity of which can be controlled to produce a wide range of olefin polymers and co-polymers, and preferably for the production of stereoblock poly alpha-olefins comprising a wide range of preselected amorphous and crystalline segments for precise control of the physical properties thereof, principally elastomeric thermoplastic properties. More specifically, this invention is directed to novel metallocene catalysts and catalyst systems for producing stereoblock polypropylene comprising alternating isotactic and atactic diastereosequences, which result in a wide range of elastomeric properties. The amount and number of crystalline sections, the isotactic pentad content, the number and length of intermediate atactic chains and overall molecular weight are all controllable by the electronic and steric nature of the catalysts and the process conditions. The novel catalysts provided by the present invention are ligand-bearing non-rigid metallocenes the geometry of which can change on a time scale that is slower than the rate of olefin insertion, but faster than the average time to construct (polymerize) a single polymer chain, in order to obtain a stereoblock structure in the produced polyolefins. The symmetry of the catalyst structure is such that upon isomerization the catalyst symmetry alternates between a chiral and an achiral geometry. This geometry alternation can be controlled by selecting ligand type and structure, and through control of polymerization conditions to precisely control the physical properties of the resulting polymers.

This invention includes a novel process for tailoring the block size distribution and resulting properties of the polymer such as the tacticity, molecular weight, molecular weight distribution, melt flow rate, melting point, crystallite aspect ratio, tensile set and tensile strength by varying the structure of the catalyst and the conditions of the polymerization reaction.

In a preferred embodiment the catalysts and methods of this invention produce a novel class of elastomeric polymers comprising units derived from propylene, which have a high molecular weight and a narrow molecular weight distribution, which are homogeneous in their composition. By homogeneous in composition, we mean that if the polymer can be fractionated by whatever solvent or solvent system(s), all the polymer fractions have similar molecular weight distributions $M_w/M_n$, typically less than 7, preferably less than 5, and most preferred less than 4.

The thermoplastic elastomeric polypropylenes of this invention exhibit elongations to break from 20% to 5000%, typically between 100% and 3000% with tensile sets between 5% and 300%, typically between 10% and 200%, and preferably between 10% and 70%. Tensile strengths for these polypropylenes range from 100 psi to 6000 psi, typically between 400 psi and 5000 psi. The crystallinity of the polymers range from amorphous materials with no melt, to crystalline thermoplastic with melting points of about 165° C. Preferably the melting points range from about 50° to about 165° C.

The catalyst system of the present invention consists of the transition metal component metallocene in the presence of an appropriate cocatalyst. In broad aspect, the transition metal compounds have the formula:

Formula 1 in which M is a Group 3, 4 or 5 Transition metal, a Lanthanide or an Actinide, X and X' are the same or different hydride, halogen, hydrocarbyl, or halohydrocarbyl substituents, and L and L' are the same or different substituted cyclopentadienyl or indenyl ligands, in combination with an appropriate cocatalyst. Exemplary preferred transition metals include Titanium, Hafnium, Vanadium, and the present best mode, Zirconium. An exemplary Group 3 metal is Yttrium, a Lanthanide is Samarium, and an Actinide is Thorium.

The transition metal substituents X and X' may be the same or different hydride, halogen, hydrocarbyl, or halohydrocarbyl substituents, X and X' are preferably halogen, alkoxide, or $C_1$ to $C_7$ hydrocarbyl.

The ligancis L and L' may be any mononuclear or polynuclear hydrocarbyl or silahydrocarbyl, typically a substituted cyclopentadienyl ring. Preferably L and L' have the formula:

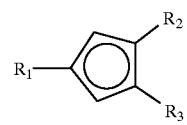

Formula 2 where $R_1$, $R_2$, and $R_3$ may be the same or different alkyl, alkylsilyl, or aryl substituents of 1 to about 30 carbon atoms. Most preferably, $R_1$ is an aryl group, such as a substituted phenyl, biphenyl, or naphthyl group, and $R_2$ and $R_3$ are connected as part of a ring of 3 or more carbon atoms.

Especially preferred for L or L' of Formula 1 is a 2-arylindene of formula:

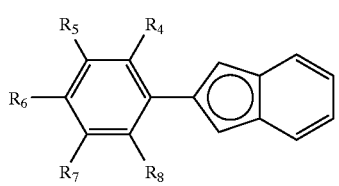

Formula 3

Where $R_4$, $R_5$, $R_6$, $R_7$ and $R_8$ may be the same or different hydrogen, halogen, aryl, hydrocarbyl, silahydrocarbyl, or halohydrocarbyl substituents. That is, $R_1$ of Formula 2 is $R_4$-$R_8$-substituted benzene, and $R_2$, $R_3$ are cyclized in a 6-C ring to form the indene moiety. Particularly preferred 2-aryl indenes include as present best mode compounds: 2-phenylindene, 2-(3,5-dimethylphenyl) indene; 2-(3,5-bis-trifluoromethylphenyl) indene; 2-(4,-fluorophenyl) indene; 2-(2,3,4,5-tetrafluorophenyl) indene; 2-(2,3,4,5,6-pentafluorophenyl) indene; 2-(1-naphthyl) indene; 2-(2-naphthyl) indene; 2-[(4-phenyl)phenyl] indene; and 2-[(3-phenyl)phenyl] indene.

Preferred metallocenes according to the present invention include: bis[2-phenylindenyl]zirconium dichloride; bis[2-phenylindenyl]zirconium dimethyl; bis[2-(3,5-dimethylphenyl) indenyl] zirconium dichloride; bis [2-(3,5-bistrifluoromethylphenyl)indenyl]zirconium dichloride; bis [2-(4,-fluorophenyl)indenyl]zirconium dichloride; bis[2-(2,3,4,5,-tetrafluorophenyl)indenyl]zirconium dichloride; bis [2-(2,3,4,5,6-pentafluorophenyl)indenyl]zirconium dichloride; bis[2-(1-naphthyl) indenyl]zirconium dichloride; bis [2-(2-naphthyl) indenyl] zirconium dichloride; bis[2-[(4-phenyl)phenyl]indenyl]zirconium dichloride; bis[2-[(3-phenyl)phenyl]indenyl] zirconium dichloride; and the same hafnium compounds such as: bis[2-phenyl(indenyl)-hafnium dichloride; bis[2-phenyl(indenyl)]hafnium dimethyl; bis[2(3,5-dimethylphenyl)indenyl]hafnium dichloride; bis[2-(3,5-bistrifluoromethyphenyl)indenyl]hafnium dichloride; bis[2,(4-fluorophenyl)indenyl]hafnium dichloride; bis[2-(2,3,4,5-tetrafluorophenyl)indenyl]-hafnium dichloride; bis(2-(2,3,4,5,6-pentafluorophenyl)indenyl] hafnium dichioride; bis[2-(1-naphthyl)indenyl]hafnium dichloride; bis[2-(2-naphthyl))indenyl] hafnium dichioride; bis[2-[(4-phenyl)phenyl)indenyl]hafnium dichloride; bis[2-[(3-phenyl)phenyl]indenyl]hafnium dichloride; and the like.

FIG. 1 shows the structure of a preferred catalyst bis-(2-phenylindenyl) zirconium dichloride. As shown in the figure, this complex crystallizes in two conformations, a racemic-like conformation 1a and a meso-like conformation 1b.

The Examples disclose a method for preparing the metallocenes in high yield. Generally, the preparation of the metallocenes consists of forming the cyclopentadienyl or indenyl ligand followed by metallation with the metal tetrahalide to form the complex.

Appropriate cocatalysts include alkylaluminum compounds, methylaluminoxane, or modified methylaluminoxanes of the type described in the following references: U.S. Pat. No. 4,542,199 to Kaminsky, et al,; Ewen, *J. Am. Chem. Soc.,* 106 (1984), p. 6355; Ewen, et al., *J. Am. Chem. Soc.* 109 (1987) p. 6544; Ewen, et al., *J. Am. Chem. Soc.* 110 (1988), p. 6255; Kaminsky, et al, *Angew. Chem., Int. Ed. Eng.* 24 (1985), p. 507. Other cocatalysts which may be used include Lewis or protic acids, such as $B(C_6F_5)_3$ or $[PhNMe_2H)]^+B(C_6F_5)_4^-$, which generate cationic metallocenes with compatible non-coordinating anions in the presence or absence of alkylaluminum compounds. Catalyst systems employing a cationic Group 4 metallocene and compatible non-coordinating anions are described in European Patent Applications 277,003 and 277,004 filed on Jan. 27, 1988 by Turner, et al.; European Patent Application 427,697-A2 filed on Oct. 9, 1990 by Ewen, et al.; Marks, et al., *J. Am. Chem. Soc.,* 113 (1991), p. 3623; Chien, et al., *J. Am. Chem. Soc.,* 113 (1991), p. 8570; Bochmann et al., *Angew. Chem. Intl. Ed. Engl.* 7 (1990), p. 780; and Teuben et al., *Organometallics,* 11 (1992), p. 362, and references therein.

The catalysts of the present invention consist of non-rigid metallocenes which can change their geometry on a time scale that is between that of a single monomer insertion and the average time of growth of a polymer chain. This is provided by a non-rigid metallocene catalyst comprising of cyclopentadienyl ligands substituted in such a way that they can alternate in structure between racemic-like and meso-like geometries. This is achieved in the present invention by utilizing unbridged cyclopentadienyl ligands with a 1,2,4-substitution pattern on the cyclopentadienyl moiety. This substitution pattern insures that the ligand is achiral and will not result in diastereomers upon complexation with the metal, thus avoiding unwieldy separation of isomeric metallocenes. In addition, this substitution pattern provides catalysts which can isomerize between a meso-like and racemic-like geometry.

In one of many embodiments, these catalyst systems can be placed on a suitable support such as silica, alumina, or other metal oxides, $MgCl_2$, or other supports. These catalysts can be used in the solution phase, in slurry phase, in the gas phase, or in bulk monomer. Both batch and continuous polymerizations can be carried out. Appropriate solvents for solution polymerization include aliphatic or aromatic solvents such as toluene, benzene, hexane, heptane, as well as halogenated aliphatic or aromatic solvents such as $CH_2Cl_2$, chlorobenzene, flourobenzene, hexaflourobenzene or other suitable solvents. Various agents can be added to control the molecular weight, including hydrogen, silanes and metal alkyls such as diethylzinc.

The metallocenes of the present invention, in the presence of appropriate cocatalysts, are useful for the polymerization of ethylene and alpha-olefins, such as propylene, 1-butene, 1-pentene, 4-methyl-1-pentene, 1-hexene, 1-octene and combinations thereof. The polymerization of olefins is carried out by contacting the olefin with the catalyst systems comprising the transition metal component and in the presence of an appropriate cocatalyst, such as an alumoxane, or a Lewis acid such as $B(C_6F_5)_3$. The catalysts are more active than the Chien catalysts for the polymerization of ethylene and alpha olefins with productivities of $3 \times 10^6$ g polymer/mol Zr.hr for ethylene being readily obtained.

The metallocene catalyst systems of the present invention are particularly useful for the polymerization of propylene to produce polypropylenes with novel elastomeric properties. By elastomeric, we mean a material which tends to regain its shape upon extension, or one which exhibits a positive power of recovery at 100%, 200% and 300% elongation. The properties of elastomers are characterized by several variables. The initial modulus ($M_i$) is the resistance to elongation at the onset of stretching. This quantity is simply the slope at the beginning of the stress-strain curve. Upon overstretching, the polymer sample eventually ruptures. The rupture point yields two important measurements, the tensile strength ($T_b$) and the ultimate elongation ($E_b$). These values are the stress and percent elongation at the break, respectively. The tensile set (TS) is the elongation remaining in a polymer sample after it is stretched to 300% elongation and allowed to recover. An additional measure of the reversibility of stretching is the percent recovery (PR), which is given by the equation:

$$100(L_{max}-L_{relax})/(L_{max}-L_{init}).$$

It is believed that the elastomeric properties of the polypropylenes of this invention are due to an alternating block structure comprising of isotactic and atactic stereosequences. Without being bound by theory, it is believed that isotactic block stereosequences provide crystalline blocks which can act as physical crosslinks in the polymer network.

The structure of the polymer can be described in terms of the isotactic pentad content [mmmm] which is the percentage of isotactic stereosequences of 5 contiguous stereocenters, as determined by $^{13}C$ NMR spectroscopy Zambelli, A.; Locatelli, P.; Bajo, G.; Bovey, F. A., "Model Compounds and $^{13}$C NMR Observation of Stereosequences of Polypropylene" *Macromolecules* 1975, 8, 687–689. The isotactic pentad content of statistically atactic polypropylene is approximately 6.25%, while that of highly isotactic polypropylene can approach 100%.

While it is possible to produce polypropylenes with a range of isotactic pentad contents, the elastomeric properties of the polymer will depend on the distribution of isotactic (crystalline) and atactic (amorphous) stereosequences. Thermoplastic elastomers consist of amorphous-crystalline block polymers, and thus the blockiness of the polymer determines whether it will be elastomeric.

The blockiness of the polymer can be described in terms of the fraction of isotactic stereosequences of four or more stereocenters (Randall J. C., "Carbon13 Nuclear Magnetic Resonance Quantitative Measurements of Average Sequence Length of Like Stero-Chemical Additions in Propylene and Polystyrene" *J. Poly Sci. Poly. Phys.* 1976, 14, 2083–2094) which we will denote as the isotactic Block Index, <BI>. The isotactic Block Index can be determined directly from the pentad distribution and is given by (Randall 1976) as:

$$<BI>=4+2[mmmm]/[mmmr].$$

The isotactic Block Index for purely atactic polypropylene is <BI>=5, while that for highly isotactic polypropylene can exceed <BI>=104 (Collette J. W.; Ovenall, D. W.; Buck, W. H.; Ferguson, R. C., "Elastomeric Polypropylenes from Alumina-supported Tetraalkl Group IVB Catalysts. 2. Chain Microstructure, Crystallinity, and Morphology" *Macromolecules* 1989, 22, 3858–3866).

We have discovered that the structure, and therefore the properties of the polypropylenes obtained with the catalysts of the present invention are dependent on the olefin concentration, the temperature of the polymerization, the nature of the transition metal, the ligands on the metallocene, and the nature of the cocatalyst. Under certain circumstances (solution polymerization at low propylene pressures) we have observed that the isotactic pentad content [mmmm] and the Block Index, <BI>, of the resulting polypropylene increase with decreasing polymerization temperature. Under other conditions (polymerization in bulk monomer) we see the isotactic pentad content increase with increasing temperature.

The structure, and therefore the properties of the obtained polypropylenes also depends on the propylene pressure during the polymerization reaction. The isotactic pentad content [mmmm] and the isotactic Block Index, <BI>, of the polypropylenes increase with increasing propylene pressure. The productivity and average molecular weight of the polypropylenes also increase with increasing propylene pressure.

The structure, and therefore the properties of the obtained polypropylenes also depend on the nature of the ligands bound to the transition metal. For example, for catalysts derived from bis[2-(3,5-bis-trifluoromethylphenyl)indenyl] zirconiumdichloride metallocene, isotactic pentad contents up to [mmmm]=71% and isotactic Block Indexes <BI>= 15.3 can be readily obtained, with even higher values indicated.

It will be appreciated from the illustration examples that this catalyst system provides an extraordinary broad range of polymer properties from the polymerization process of this invention. Isotactic pentad contents from [mmmm]=6.1% to [mmmm]=71% can be readily obtained by suitable manipulation of the metallocene catalyst, the reaction conditions, or the cocatalyst to give polymers which range in properties from gum elastomers to thermoplastic elastomers to flexible thermoplastics, and indeed, to relatively rigid thermoplastics.

This invention also provides a novel process for tailoring the block size distribution as reflected in the isotactic pentad content [mmmm] and properties of the polymer such as melting point, tensile set and tensile strength by varying the structure of the catalyst and the conditions of the polymerization reaction. The invention provides a process whereby the isotactic pentad content and the properties of the polymer can be tailored through changes in the pressure of monomer, the temperature of polymerization, the nature of the transition metal, the nature of the ligands and the nature of the cocatalyst.

Without being bound by theory, it is believed that it is critical for the present invention to have a catalyst which can isomerize on a time scale that is slower than the rate of olefin insertion but faster than the average time to construct a single polymer chain in order to obtain a block structure. In addition, to produce elastomeric polymers, the catalyst complex isomerizes between a chiral racemic-like and an achiral meso-like geometry. This is provided in the present invention by metallocene catalysts comprising of unbridged cyclopentadienyl-based ligands which are substituted in such a way that they can exist in racemic or meso-like geometries.

Based on the evidence to date, it appears that the rotation of the cyclopentadienyl ligands provides a mechanism for the alternation of catalyst geometry. The average block size distribution for a polymer produced with a catalyst which can change its state is controlled by the relative rate of polymerization versus catalyst isomerization as well as the steady-state equilibrium constant for the various coordination geometries (e.g. chiral vs. achiral). The catalysts of this invention provide a means of producing polypropylenes and other alpha olefins with a wide range of isotactic and atactic block lengths by changing the substituents on the cyclopentadienyl ligands of the metallocene. It is believed that modification of the cyclopentadienyl ligands and/or the nature of the transition metal will alter one or more of the following: The rate of polymerization, the rate of catalyst isomerization, and the steady-state equilibrium constant between the various coordination geometries, all of which will affect the block lengths and block length distribution in the resulting polymer. For example, it is believed that introduction of larger substituents on the cyclopentadienyl ligands will slow the rate of rotation and thereby increase the block lengths in the polymer.

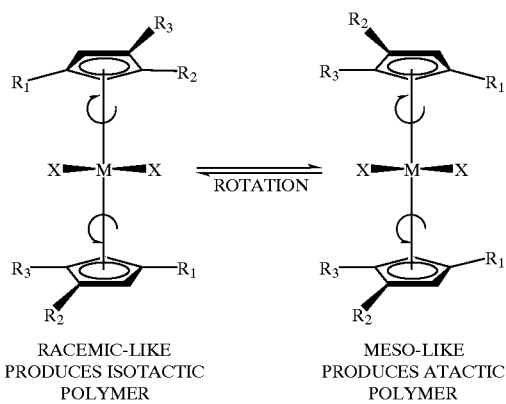

RACEMIC-LIKE
PRODUCES ISOTACTIC
POLYMER

MESO-LIKE
PRODUCES ATACTIC
POLYMER

The increase in isotactic pentad content [mmmm] and Block Index <BI> with propylene pressure appears due to an increase in the relative rate of polymerization relative to catalyst isomerization. It is further believed that the increase of isotactic pentad content [mmmm] and Block Index <BI> as the temperature of polymerization is decreased for polymerizations carried out in solution is also a result of increasing the relative rate of polymerization relative to isomerization with decreasing temperature. Thus, the present invention provides a rational method of control of the length of isotactic blocks, and therefore the melting points, tensile strengths, and tensile modulus, with changes in the process conditions.

The importance of freely rotating ligands is demonstrated by the polymerization of propylene with the bridged racemic and meso isomers of ethylene-1,2-bis-(2-phenyl-1-indenyl) zirconium dichloride, (Catalyst K, L). Polymerization of propylene with the rac isomer, Catalyst K, yielded isotactic polypropylene. Polymerization of propylene with the rac/meso mixture yielded a blend of atactic and isotactic polypropylene rather than a block copolymer. That this mixture was a blend was demonstrated by fractionation of the atactic material with pentane. The pentane-soluble fraction was amorphous, atactic polypropylene, and the pentane-insoluble fraction was crystalline, isotactic polypropylene.

The invention also includes novel bridged catalysts of the structure:

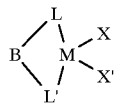

Wherein L, L', M, X, and X' are as above, and B is a structural bridge between the ligands L, L' imparting stereorigidity to the catalyst in either/both rac and meso geometries, B being preferably selected from a $C_1$–$C_4$ alkylene radical, and Ge, Si, P and In hydrocarbyl radicals.

The polymers of the present invention in one embodiment are a novel class of thermoplastic elastomers made up of propylene homopolymers of molecular weights ranging from 20,000 to above about 2 million. The average molecular weights of the polypropylenes are typically high, as molecular weights on the average of 1,600,000 are readily obtainable and even higher are indicated. The processability of polymers in fiber and film applications is a function of the molecular weight or melt flow rate of the material. It is well known that polymers with high molecular weights (low melt flow rates), while advantageous in certain applications, are quite difficult to process and typically require post treatment with peroxide to increase the melt flow rate. This involves an extra processing step and can add significantly to the cost of the product. Accordingly, hydrogen is used in many polymerization processes to control molecular weight during the reaction (Welborn U.S. Pat. No. 5,324,800 and refs therein). Homogeneous metallocene catalysts are known to be quite sensitive to hydrogen (Kaaminsky Makromol. Chem., Rapid Commun. 1984, 5, 225). We have found that the molecular weight and melt flow rate of the polymers of this invention can easily be ontrolled by using small amounts of hydrogen. For example, for he polymers of this invention, while a melt flow rate of <0.1 dg/min (high molecular weight, low processability) is readily obtained in the absence of hydrogen, the addition of as little as 0.17 mmol $H_2$/mol propylene can result in an increase in melt flow rate to 25 dg/min (lower molecular weight, high processability). The melt flow rate is the amount of polymer that extrudes under a 2.0 Kg standard weight through a standard orifice at a standard temperature. In contrast, the MPR of the Collette (du Pont) polypropylene polymers is <0.1 dg/min, even after 11 mmol $H_2$/mol polypropylene, a clear difference in kind.

The molecular weight distribution ($M_w/M_n$) of polymers made with heterogeneous catalysts is known to be quite broad, especially compared with similar polymers made with homogeneous metallocene based catalysts. Davey, et al (U.S. Pat. No. 5,322,728) have described the difficulties of processing polymers having broad molecular weight distributions, especially in the manufacture of fiber products. In contrast, the molecular weight distributions of the polymers of the present invention are quite low, with typical polydispersities, $M_w/M_n$, ranging from 1.7 to 5. However, by control of reaction conditions, higher molecular weight distributions also can be obtained, e.g., polydispersities of 5–20 are easily produced.

The polypropylenes of the present invention have isotactic pentad contents ranging from [mmmm] =6.3%, corresponding to statistically atactic polypropylenes, to [mmmm] =71%, corresponding to an elastomeric polypropylene with high isotacticity. The polypropylenes of the present invention range from amorphous atactic polypropylenes with no melting point, to elastomeric polypropylenes of high crystallinity with melting points up to 165° C.

Accordingly, because of the wide range of structures and crystallinities, the polypropylenes of the present invention exhibit a range of properties from gum elastomers, to thermoplastic elastomers, to flexible thermoplastics. The range of elastomeric properties for the polypropylenes is quite broad. Elongations to break typically range from 100% to 3000%, tensile strengths range from 400 psi to over 5000 psi. Tensile set at 300% elongation as low as 32% and below can be readily obtained, and tensile set is generally below about 70%. Cold drawing results in improved elastic recoveries, a valuable property for films and fibers.

The polypropylenes of the present invention exhibit low creep, particularly for samples of higher crystallinity. They can be melt spun into fibers, or can be cast into transparent, tough, self-supporting films with good elastic recoveries. Thin films of elastomeric polypropylenes with isotactic pentad contents [mmmm] =30% are slightly opaque, but exhibit stress-induced crystallization. Upon isolation of an elastomeric polypropylene of this invention from solution under vacuum, the polymer was observed to make a closed-cell foam, with a spongy texture. The elastomeric polypropylenes can also be cast into molded articles. Samples of lower crystallinity were observed to adhere quite well to glass.

The elastomeric polymers of the present invention form excellent adhesives. They adhere well to glass, paper, metals and other materials. A sample of lower crystallinity was observed to adhere well to paper, allowing a manila folder to be attached to and supported on a metal filing cabinet. Upon removal of the material, the sample remained adhered to the paper and no residue was left on the metal surface.

The polypropylenes of the present invention can be blended with isotactic polypropylenes. The melting points and heats of fusion of the blends increase steadily with increasing mole fraction of isotactic polypropylene in the blend.

The utility of the polymers of the present invention are evident and quite broad, including without limitation: films; fibers; foams; molded articles; adhesives; and resilient and elastomeric objects. As they are completely compatible with isotactic polypropylenes, they are ideal candidates as additives for blends to improve the toughness and impact strength of isotactic polypropylenes.

BRIEF DESCRIPTION OF DRAWINGS

The invention is illustrated in part by references to the drawings in which.

BEST MODE FOR CARRYING OUT THE INVENTION

Figure 1:
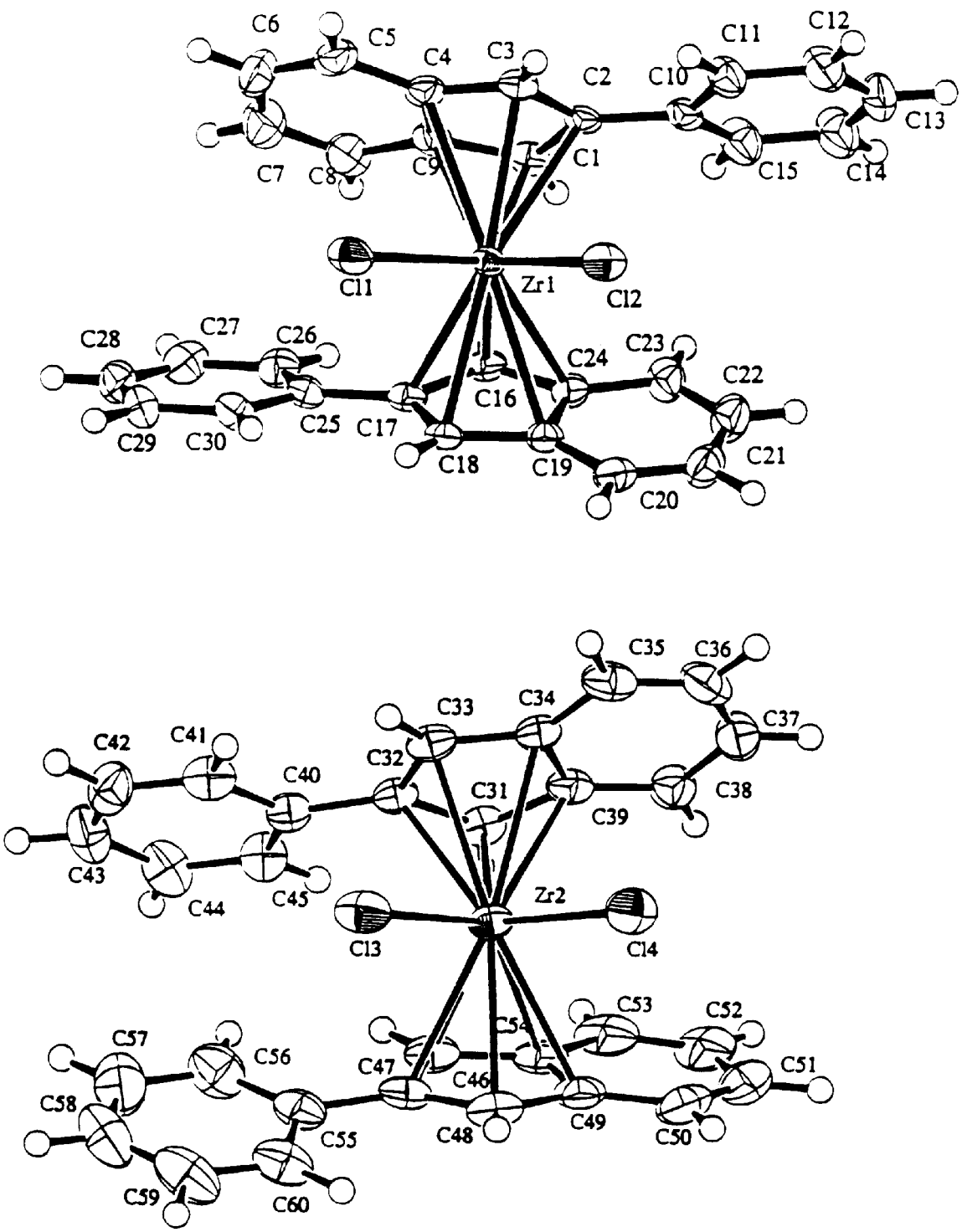
FIG. 1 is an ORTEP diagrammatic representation of a typical metallocene-complex catalyst of this invention employing two substituted indenyl ligands bound to zirconium, two isomers of bis (2-phenylindenyl) zirconium dichloride, which crystallize in both rotameric forms, a chiral, racemic rotamer (top) and an achiral, meso rotamer (bottom)

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Analytical Methods

Molecular weight data are obtained on a Waters 150C GPC instrument at 139° C. using 0.07% (wt/vol) solutions of the polymer in 1,2,4-trichlorobenzene using isotactic polypropylene as a reference standard.

Isotacticity data from $^{13}C$ NMR are obtained at 130° C. with a Varian Unity 500 MHz NMR spectrometer operating at 125 MHz or a Varian XL-400 MHz NMR spectrometer operating at 100 MHz. Samples are run as solutions of 0.25 g polymer in 2.6 mL dideuterotetrachloroethane or as 0.05 g polymer in 0.5 mL dideuterotetrachloroethane.

Thermal analysis are carried out on a du Pont Instruments 951 Thermogravimetric Analyzer or a Perkin Elmer DSC-7 Differential Scanning Calorimeter. Melting points are taken as the main endothermic peak from a 20 mg sample heated from –40° C. to 200° C. at 20° C./min, rapid cooling to –40° C. and then reheating at 20° C. /min. The heat of fusion is determined from the area of the heat flow/temperature curve.

Melt flow rates are determined using a Tinius Olsen Melt Flow Meter operating at 232° C. according to ASTM method D1238. In a typical experiment, 5 grams of the polymer sample is mixed with 50 mg of BHT and this mixture added to the heating chamber. A 2.0 Kg mass is attached to a plunger inserted into the heating chamber and the melt flow is determined by measuring the quantity of material extruded over a period of 1 minute. Results are reported in units of decigrams polymer/minute of flow, or grams/10 min by ASTM method D1238.

X-ray diffractions crystallinity data are obtained on a Scintag PAD-V, high resolution powder diffractometer, with Cu K-alpha radiation, standard source and receiving aperatures with internal soller slits, and a high purity Ge energy dispersive detector. All samples except for films were compression molded to obtain smooth dense surfaces with 2–3 mm thickness. Disks of approx. 2.5 cm diameter are cut from the molding and pressed into the rim of the cylindrically shaped sample holder. If smooth surfaces cannot be obtained by this method, the samples are flash melted at 400° F. and quick quenched to room temperature. The resultant films are then placed on a zero-background holder and mounted on the diffractometer. The continuous step-scanning mode is used over the two-theta range from 5 to 50 degrees, using 0.04 to 0.05 degree steps. Typical counting times are 5–10 seconds per point. Crystallinity is defined by the area of the Bragg maxima divided by the total diffraction area.

STM images are obtained on a Digital Instruments model Nanoscope II with side and top viewing microscopes. Thin sections of the polymers are prepared by cryogenic ultra-microtome from a molded specimen. These blocks are then coated with amorphous carbon and imaged by scanning tunneling microscopy. Amorphous carbon coating of polymers to obtain near molecular resolution of the coated polymer by tunneling microscopy is an accepted preparation technique free from artifacts at the size scale of interest for imaging crystallites (3–10 nm) (G. W. Zajac, M. Q. Patterson, P. M. Burrell, C. Metaxas "Scanning Probe Microscopy Studies of Isotactic Polypropylene", Ultramicroscopy 42–44 (1992) 998). The coated polymer blocks are secured by silver paste onto copper blocks for optimal conductivity. The typical STM imaging conditions are 1000–1500 mV and 1 nA tunneling current.

I. Metallocene Catalyst Preparation

EXAMPLE 1

Preparation of 2-Phenylindene, (Ligand 1)

A solution of 2-indanone (13.47 g, 102 mmol) in anhydrous benzene (100 mL) is added to phenylmagnesium bromide (3.0M in diethyl ether, 50.9 mL, 153 mmol) at 5° C. over 2.5 hours. The reaction was allowed to warm to room temperature over 30 minutes. The solution was cooled to 0° C. and 150 mL of water are added. The resultant mixture was diluted with 200 mL of hexanes, neutralized with 5M HCl, and washed with brine (2×100 mL). The aqueous layer was extracted with hexanes (2×50 mL), and the combined organic layers were dried (MgSO$_4$), filtered, and the solvent removed in vacuo from the filtrate to yield a brown oil. This oil and p-toluenesulfonic acid (0.50 g) were dissolved in benzene (250 mL) in a round-bottom flask below a Soxhlet extractor containing 4 Å molecular sieves. After refluxing for 2.5 hours, the solution was filtered and cooled to 5° C. overnight. The product, a white flaky solid, was collected by filtration, and was washed with 50 mL of cold benzene. Additional product is obtained by concentrating the filtrate, cooling, and filtering the crystals (12.60 g, 64.3% yield). $^1$H NMR (400 Mhz, 20° C., CDCl$_3$)δ 7.62 (d, J=7.3 Hz, 2H), 7.47 (d, J=7.3 Hz, 1H), 7.39 (M, 3H), 7.27 (m, 2H), 7.22 (s,1H), 7.18 (t, J=7.4 Hz, 1H), 3.78 (S<2H). $^{13}$C{$^1$H} NMR (100 Mhz, 20° C., CDCl$_3$): δ 146.3, 145.3, 143.1, 135.9, 128.6, 127.5, 126.5, 126.4, 125.6, 124.7, 123.6, 120.9, 38.9.

EXAMPLE 2

Preparation of Bis (2-phenylindenyl) zirconium dichloride, Catalyst A (Ligand 1)

A solution of n-butyllithium (1.6M in hexanes, 3.25 mL, 5.2 mmol) was added to a solution of 2-phenylindene (1.01 g, 5.3 mmol) in tetrahydrofuran (40 mL) at -78° C. over 2 minutes. The orange solution was warmed to room temperature over 30 minutes. After solvent is removed in vacuo, the yellow solid was suspended in toluene (25 mL). To this mixture was added a suspension of ZrCl$_4$ (612 mg, 2.6 mmol) in toluene (25 mL) at room temperature. This yellow solution is stirred for 2.5 h, heated to 80° C., and filtered over a medium frit packed with Celite. The Solution was cooled to -20° C. overnight, resulting in the formation of yellow-orange rod-like crystals of bis (2-phenylindenyl) zirconium dichloride (1.173 g, 82.0% yield). $^1$H NMR (400 Mhz, 20° C., C$_6$D$_6$): $^d$ 7.38 (d, J=7.1 Hz, 4H), 7.17 (m, 4H), 7.10 (m, 2H), 7.04 (dd, J=6.5, 3.1 Hz, 4H), 6.90 (dd, J=6.5, 3.1 Hz, 4H), 6.41 (s, 4H). $^{13}$C{$^1$H} NMR (100 MHz, 20° C., C$_6$D$_6$)$^d$ 133.6, 132.7, 128.9, 128.5, 127.2, 126.9, 126.7, 125.1, 103.6. X-Ray Crystal Structure: See FIG. 1.

EXAMPLE 3

Preparation of Bis(2-phenylindenyl) zirconium dimethyl, Catalyst B (Ligand 1)

A solution of methyllithium (1.4 in diethyl ether, 0.75 mL, 1.05 mmol) was added to a solution of bis(2-phenylindenyl) zirconium dichloride (280 mg, 0.51 mmol) in diethyl ether (100 mL) at -100° C. The bright yellow solution is warmed to room temperature over 30 minutes. After 3 hours, volatiles are removed from the colorless solution and toluene is added (25 mL). The solution was filtered over a medium frit packed with Celite, and solvent is removed in vacuo. Crystallization from toluene (1 mL) and pentane (15 mL) yields cream colored cubes (110 mg, 42.5%). $^1$H NMR (400 Mhz, 20° C., C$_6$D$_6$): $^d$ 7.28 (m, 4H), 7.16 (M, 6H), 702 (dd, J=6.4, 3.2 Hz, 4H), 6.93 (dd, J=6.5, 3.2 Hz, 4H), 6.00 (s, 4H), -0.85 (s, 6H).

EXAMPLE 4

Preparation of Bis(2-phenylindenyl) hafnium dichloride, Catalyst C (Ligand 1)

A solution of n-butyllithium (2.5M in hexanes, 2.45 mL, 61 mmol) was added to a solution of 2-phenylindene (1.18 g, 61 mmol) in tetrahydrofuran (40 mL) at -78° C. over 2 minutes. The orange solution was warmed to room temperature over 30 minutes. After solvent is removed in vacuo, the orange oil was suspended in toluene (65 mL). To this mixture was added a suspension of HfCl$_4$ (99.99% Hf, 980 mg, 3.1 mmol) in toluene (5 mL) at room temperature. This rust colored solution was stirred in the dark for 3 hours and filtered over a medium frit packed with Celite. Solvent is removed to yield a dark orange solid. A 100 mg sample is freed from unreacted ligand by sublimation at 120° C. Recrystallization from toluene at -20° C. overnight yields a dark yellow solid (28 mg, 28% yield). $^1$H NMR (400 Mhz 20° C$_6$D$_6$): δ 7.36 (d, J=7.2 Hz, 4H), 7.18 (m, 4H), 7.12 (m, 2H), 7.07 (dd, J=6.6, 3.1 Hz, 4H) 6.88 (dd, J=6,6, 3.1 Hz, 4H), 6.29 (s, 4H). $^{13}$C {$^1$H} NMR (100 Mhz) 20° C., C$_6$D$_6$): $^d$ 132.7, 132.1, 128.8, 128.5, 127.2, 126.1, 125.1, 101.4.

EXAMPLE 5

Preparation of 2-(Bis-3,5-trifluoromethylphenyl) indene, Ligand 2

A 3-neck 500 mL round-bottomed flask fitted with a condenser and an addition funnel was charged with 2.62 g (0.11 mol) of Mg turnings and 20 mL of anhydrous Et$_2$O. Slow addition of a solution of 25.10 g (0.09 mol) of 3,5-bis(trifluoromethyl) bromobenzene in Et$_2$O (100 mL), followed by refluxing for 30 min, gave a brown-grey solution of the aryl Grignard reagent. The solution was cooled to room temperature, filtered over a plug of Celite and evacuated to yield a brown oil. Toluene (40 mL) was added and the suspension cooled to 0° C. whereupon a solution of 2-indanone (9.22 g, 0.07 mol) in toluene (60 mL) was added dropwise to give a tan-brown slurry. This mixture was warmed to room temperature and stirred for an additional 3 hours. After cooling to a 0° C. it was quenched with 150 mL of water. Hexane (200 mL) was added and the reaction mixture neutralized with 5M HCl. The organic layer was separated, and the aqueous layer was extracted with two 50-mL portions of hexane. The combined organic layers were washed with two 50-mL portions of brine and dried over anhydrous magnesium sulfate. After filtration over Celite, the solvent was removed under vacuo yielding 21.5 g (89% based on 2-indanone) of 2-(bis-3,5-(trifluoromethyl) phenyl)indanol as an off-white solid. $^1$H NMR (DCDl$_3$, 23° C., 400 Mhz): $^d$ 8.05 (s, 2H), 7.80 (s, 1H), 7.5–7.0 (M, 4H), 3.41 (m, 4H), 2.21 (s, 1H, OH). Under argon, this alcohol (21.5 g, 0.06 mol) and p-toluene-sulfonic acid monohydrate (800 mg) were dissolved in toluene (250 mL) and the solution was heated to reflux for 6 hours to afford 14.4 g, (70%) of 2-(bis-3,5-(trifluoromethyl)-phenyl) indene upon recrystallization from diethyl ether/hexane at -18° C. $^1$H NMR (CDCl$_3$, 23° C., 400 Mhz): $^d$ 8.01 (s, 2H), Ar$_f$), 7.75 (s, 1H, Ar$_f$), 7.52 (d, J=7 Hz, 1H), 7.47 (d, J=7 Hz, 1H), 7.43 (s, 1H), 7.33 (dd, 2J=7 Hz, 1H), 7.27 (dd, 2J- 7 Hz, 1H), 2.83 (s, 2H). $^{13}$C NMR (CDCl$_3$, 23° C., 100 Mhz): $^d$ 144.3 (s), 143.1 (s), 138.0 (s), 132.1 (q $^2$J$_{C-F}$=33 Hz), 130.1 (d, J$_{C-H}$=167 Hz), 127.0 (dd), J$_{C-H}$=160 Hz, $^2$J$_{C-H}$=7 Hz), 126.0 (dd, J$_{C-H}$=159 Hz, $^2$J$_{C-H}$=7 Hz)m 125.2 (brd, J$_{C-H}$=162 Hz), 123.9 (dd, J$_{C-H}$=156 Hz, $^2$J$_{C-H}$=9 Hz), 123.4 (q, J$_{C-F}$=273 Hz, CF$_3$), 121.8 (dd, J$_{C-H}$=160 Hz, $^2$J$_{C-H}$=8 Hz), 120.6 (brd, J$_{C-H}$=167 Hz), 38.9 (td, J$_{C-H}$=127 Hz, $^2$J$_{C-H}$=7 Hz, CH$_2$). C,H analysis: Anal. Found (Calcd): C, 62.45 (62.20); H 3.01 (3.07).

EXAMPLE 6

Preparation of Bis(2-(Bis-3,5-trifluoromethyl phenyl)indenyl) zirconium dichloride, Catalyst D (Ligand 2)

N-Butyllithium (2.5M in hexanes, 850 mL, 2.13 mmol) was added to a solution of 2-(bis-3,5(trifluoromethyl)

phenyl)-indene (648 mg, 1.97 mmol) in toluene (15 mL). The heterogeneous solution was stirred at ambient temperature for 4 hours 30 minutes to give a green-yellow solution which was treated with a suspension of $ZrCl_4$ (240 mg, 1.03 mmol) in toluene (20 mL) via cannula. The yellow suspension was stirred at ambient temperature for 2 hours 30 minutes, heated to ca. 80° C., and filtered over a plug of Celite. After washing the Celite with hot toluene several times (3×10 mL), the filtrate was concentrated and cooled to −18° C. to give 442 mg (55%) of light yellow crystals of Bis(2-(Bis-3,5-trifluoromethylphenyl)indenyl)zirconium dichloride, catalyst D. $^1$H NMR ($C_6D_6$, 23° C., 400 Mhz): $^d$ 7.67 (s, 2H, ar$_f$), 7.55 (s, 4H, ar$_f$), 7.19 (m, 4H, Ar), 6.89 (m, 4H, Ar), 5.96 (s, 4H, Cp-H). $^{13}$C NMR ($C_6D_6$, 23° C., 100 Mhz): $^d$ 135.6 (s), 133.1 (s), 131.6 (q, $^2J_{C-F}$=33 Hz), 127.1 (brd, $J_{C-H}$=161 Hz), 126.8 (s), 126.4 (dd, $J_{C-H}$=161 Hz, $^2J_{C-H}$=8 Hz), 125.4 (dd, $J_{C-H}$=167 Hz), $^2J_{C-H}$=5 Hz), 123.8 (q, $J_{C-F}$=273 Hz, $\underline{C}F_3$), 121.8 (brd, $J_{C-H}$=159 Hz), 102.5 (dd, $J_{C-H}$=176 Hz, $^2J_{C-H}$=7 Hz, Cp, ($\overline{C}$-H). C,H analysis: Anal. found (Calcd.): C, 49.99 (50.01); H 2.32 (2.22).

EXAMPLE 7

Preparation of Bis(2-(Bis-3,5-trifluoromethyl-phenyl) indenyl) hafnium dichloride, Catalyst E (Ligand 2)

N-Butyllithium (1.6M in hexanes, 2 mL. 3.20 mmol) was added dropwise at ambient temperature to a solution of 2-(bis-3.5-(trifluoromethyl)phenyl)indene (1.03 g. 3.14 mmol) in diethyl ether (10 mL). After stirring for 30 min, the solvent was removed in vacuo leaving a green-yellow solid. In a drybox, $HfCl_4$ (510 mg, 1.59 mmol) was added to the lithium salt. The solids were then cooled to −78 ° C. at which temperature toluene (45 mL) was slowly added. The flask was allowed to reach ambient temperature and the suspension was stirred for 24 hours after which time it was heated for 15 min to ca. 80° C. (heat gun). The solvent was then removed in vacuo. The solid was extracted with $CH_2Cl_2$ (50 mL) and the solution filtered over a plug of Celite. After washing the Celite with 4×15 mL $CH_2Cl_2$, the solvent was removed under vacuo from the filtrate. The solid was dissolved in 15 mL of $CH_2Cl_2$, filtered and over filtrate a layer of hexane (40 mL) was slowly added. Crystals of Bis(2-(Bis-3,5-trifluoromethylphenyl)indenyl)hafnium dichloride Catalyst E were obtained from this layered solution at −18° C. $^1$H NMR ($C_6D_6$, 23° C., 200 MHz); $^d$ 7.65 (s, 2H, Ar$_f$), 7.51 (s, 4H, Ar$_f$), 6.7−7.3 (m, 8H Ar), 5.63 (s, 4H, Cp-H). $^{13}$C NMR (C6D6 23° C., 100 MHZ): $^d$ 135.8 (s), 132.9 (s), 131.6 (q, $^2J_{C-F}$=34 Hz), 127.2 (brd, $J_{C-H}$=160 Hz), 126.3 (dd, $J_{C-H}$=161 Hz, $^2J_{C-H}$=8 Hz), 126.0 (s), 125.6 (dd, $J_{C-H}$=167 Hz, $^2J_{C-H}$=5 Hz), 123.8 (q, $J_{C-F}$=273 Hz, $\underline{C}F_3$), 121.7 (brd, $J_{C-H}$=161 Hz), 100.1 (dd, $J_{C-H}$=176 Hz, $^2J_{C-H}$=6 Hz, Cp $\underline{C}$-H). C, H analysis: Anal. Found (Calcd.): C, 45.10 (45.18); H, 1.87 (2.01).

EXAMPLE 8

Preparation of 2-(4-tert-butylphenyl)indene, (Ligand 3)

A 3-neck 250 mL round-bottomed flask fitted with a condenser and an addition funnel was charged with 1.48 g (0.06 mol) of Mg turnings and 10 mLof anhydrous $Et_2O$ (70 mL), followed by refluxing for 1 hour, gave a yellow solution of the aryl Grignard reagent. The solution was cooled to room temperature, filtered over a plug of Celite, and evacuated to yield a yellow foam. Toluene (15 mL) was added and the suspension cooled to 0° C. and treated dropwise with a solution of 2-indanone (4.97 g, 0.04 mol) in toluene (35 mL) to give an off-white slurry. The heterogeneous reaction mixture was warmed to room temperature and stirred for an additional 30 minutes. After cooling to 0° C. it was quenched with 74 mL of water. Hexane (75 mL) was added and the reaction mixture was neutralized with 5M HCl. The organic layer was separated, and; the aqueous layer was extracted with two 15-mL portions of hexane. The combined organic layers were washed with two 30-mL portions of brine and dried over anhydrous magnesium sulfate. After filtration over Celite, the solvent was removed under vacuo yielding a yellow oily solid. The solid was triturated with small portions of hexane to give 4.65 g (46% based on 2-indanone) of 2-(4-$^t$butylphenyl)indanol as a white solid. $^1$H NMR (CDCl$_3$, 23° C., 400 Mhz): $^d$ 7.6−7.0 (m, 8H), 3.40 (m, 4H), 2.16 (s, 1H, OH), 1.25 (s, 9H $^t$Bu).

Under argon, this alcohol (4.3 g, 0.06 mol) and p-toluenesulfonic acid monohydrate (120 mg) were dissolved in benzene (74 mL) and the solution was heated to reflux for 2 hours 30 minutes to give 2-(4-$^t$butylpheny1) indene, which was recrystallized from diethyl ether/hexane at −18° C. (2.74 g, 68%). $^1$H NMR (CDCl$_3$, 23° C., 400 MHz): $^d$ 7.59 (d, J=8.5 Hz, 2H), 7.47 (d, J=7 Hz, 1H), 7.42 (d, J=8.5 Hz, 2H), 7.40 (d, J=7 Hz, 1H), 7.28 (dd, 2J=7 Hz, 1H), 7.20 (s, 1H, 7.18 (dd, 2J=7 Hz), 1H, 3.79 (s, 2H) 1.36 (s, 9H, $^t$Bu). $^{13}$C NMR (CDCl$_3$, 23° C., 100 Mhz): $^d$ 150.7 (s), 146.4 (s), 145.6 (s), 143.1 (s), 126.6 (dd, $J_{C-H}$=159 Hz, $^2J_{C-H}$=7 Hz), 125.8 (d, $J_{C-H}$=163 Hz), 125.6 (dd, $J_{C-H}$=157 Hz, $^2J_{C-H}$=7 Hz), 125.4 (dd, $J_{C-H}$=7 Hz), 124.5 (dd, $J_{C-H}$= 159 Hz, $^2J_{C-H}$=7 Hz), 123.6 (dd, $J_{C-H}$=158 Hz, $^2J_{C-H}$=8 Hz), 120.8 (dd, $J_{C-H}$=159 Hz, $^2J_{C-H}$=8 Hz), 39.0 (td, $J_{C-H}$=128 Hz, $^2J_{C-H}$=6 Hz, $\underline{C}H_2$), 34.6 (s, $\underline{C}(CH_3)_3$), 31.3. (brq, $J_{C-H}$= 126 Hz, $\underline{C}(CH_3)_3$). Anal. found (calcd.): C, 91.40 (91.88); H, 7.98 (8.12).

EXAMPLE 9

Preparation of Bis(2-(4-tert-butylphenyl)-indenyl) zirconium dichloride, Catalyst F (Ligand 3)

N-Butyllithium (1.6M in hexanes, 1.8 4 mL, 2.88 mmol) was added to a solution of 2-(4-$^t$butylphenyl)indene (710 mg, 2.86 mmol) in tetrahydrofuran (15 mL) at −78° C. The orange solution was warmed to ambient temperature and stirred for 30 minutes. The solvent was then removed in vacuo to give a yellow solid. The Schlenk flask was cooled to −78° C. and 15 mL of toluene were added. Then, a suspension of $ZrCl_4$ (333 mg, 1.43 mmol) in toluene (15 mL) was added via cannula. The solution was warmed to room temperature and stirred for 1.5 hours to give a black-red solution, which was filtered over a plug of Celite. After washing the Celite with toluene several times (3×10 mL), the filtrate was concentrated and cooled to −18° C. to give 267 mg (28% of Bis(2-(4-tertbutylphenyl)indenyl) zirconium dichloride as orange crystals. $^1$H NMR for F ($C_6D_6$, 23° C., 400 Mhz):d AB pattern centered at 7.42 ppm and integrating for 4H, AB pattern centered at 7.42 ppm and integrating for 4H, 6,56 (S, 2H, Cp-H), 1.30 (s, 9H) $^t$Bu). $^{13}$C{H} NMR ($C_6D_6$, 23° C., 100 MHz): $^d$ 151.7 (s), 132.6 (s), 130.9 (s), 127.2 (s, Ar C-H), 126.8 (s), 126.9 (s), 126.6 (s, Ar C-H), 125.9 (s, Ar C-H) , 125.1 (s, Ar C-H), 103.5 (s, Cp C-H), 34.7 (s, $\underline{C}(CH_3)_3$).

EXAMPLE 10

Preparation of Bis(2-(4-tert-butylphenyl) indenyl) zirconium dimethyl (Catalyst G)

A solution of methyl lithium (1.4M in $Et_2O$, 315mL, 0.44 mmol) was added dropwise to a solution of bis(2-(4-tertbutylphenyl)indenyl)zirconium dichloride (0.140 g, 0.21 mmol) in Et$_2$O (10 mL) at −78° C. The yellow solution was warmed to ambient temperature. After 20 min, the solution has turned colorless. It was stirred for an additional 2 hours after which time the solvent was removed in vacuo. The product was recrystallized from hexane at −18° C. Yield: 79 mg (60%). $^1$H NMR (C$_6$D$_6$, 23° C., 400 MHz): $^d$ 7.37 (m, 8H); 6.99 (m, 8H); 6.16 (s, 4H, Cp-H); 1.30 (s, 18H, t-Bu); −0.77 (s, 6H, CH$_3$). $^{13}$C NMR (C$_6$D$_6$, 23° C., 100 MHz): $^d$ 151.0 (s); 132.4 (s); 129.3 (s); 126.2 (dd, J$_{C-H}$=157 Hz, $^2$J$_{C-H}$=6 Hz, aromatic C-H); 125.9 (dd, J$_{C-H}$=156 Hz, $^2$J$_{C-H}$=6 Hz, aromatic C-H); 125.0 (brd, J$_{C-H}$=160 Hz, aromatic C-H); 124.83 (brd, J$_{C-H}$=160 Hz, aromatic C-H); 124.78 (s); 98.3 (dd, J$_{C-H}$=172 Hz, J$_{C-H}$=6 Hz, Cp C-H); 36.3 (q, J$_{C-H}$=119 Hz, Zr(CH$_3$)$_2$); 34.7 (s, C(CH$_3$)$_3$); 31.4 (q, J$_{C-H}$= 121 Hz, C(CH$_3$)$_3$).

EXAMPLE 11

Preparation of 2-(4-trifluoromethylphenyl) indene (Ligand 4)

A 3-neck 250-mL round-bottomed flask fitted with a condenser and an addition funnel was charged with 1.36 g (56 mmol) of Mg turnings and 17 mL of anhydrous Et$_2$O. Slow addition of a solution of 10.0 g (44 mmol) of 4-trifluoromethylbromobenzene in Et$_2$O (85 mL), followed by refluxing for 30 min, gave a red-brown solution of the aryl Grignard reagent (some precipitate is visible). The solution was cooled to room temperature, filtered over a plug of Celite and most of the solvent was removed in vacuo from the filtrate (ca. 15 mL of Et$_2$O remained). Toluene (25 mL) was added and the solution cooled to 0° C. whereupon a solution of 2-indanone (4.4 g, 33 mmol) in toluene (50 mL) was added dropwise to give an orange slurry. This mixture was warmed to room temperature and stirred for an additional 45 min. After cooling to 0° C., it was quenched with 95 mL of water. Hexane (75 mL) was added and the reaction mixture neutralized with 5M HCl. The organic layer was separated, and the aqueous layer was extracted with two 20-mL and one 10-mL portions of hexane. The combined organic layers were washed with two 35-mL portions of brine and dried over anhydrous magnesium sulfate. After filtration over Celite, the solvent was removed in vacuo yielding 2-(4-trifluoromethyl)phenylindanol as a solid. $^1$H NMR (CDCl$_3$ 23° C., 200 MHz): $^d$ 7.5–8 (m, 4H), 7–7.5 (m, 4H), AB pattern centered at 3.43 ppm and integrating for 4H, 2.38 (s, 1H, OH).

Under argon, this alcohol and p-toluenesulfonic acid monohydrate (200 mg) were dissolved in toluene (100 mL) and the solution was heated to reflux for 4 hours to afford 5.59 g (65%) of 2-(4-trifluoromethylphenyl)indene upon recrystallization from diethyl ether at −18° C. $^1$H NMR (CDCl$_3$, 23° C., 400 MHz): $^d$ AB pattern centered at 7.68 ppm and integrating for 4H, 7.51 (d, J=7 Hz, 1H), 7.45 (d, J=7 Hz, 1H), 7.35 (s, 1H), 7.32 (dd, 2J=7 Hz, 1H), 7.25 (dd, 2J=7 Hz, 1H), 3.81 (s, 2H). $^{13}$C NMR (CDCl$_3$, 23° C., 100 MHz): $^d$ 144.8 (s), 144.7 (S), 143.2 (s), 139.3 (s), 128.8 (d, J$_{C-H}$=168 Hz), 126.8 (dd, J$_{C-H}$=168 Hz, J$_{C-H}$=7 Hz), 125.7 (dd, J$_{C-H}$=161 Hz, J$_{C-H}$=7 HZ), 125.6 (d, J$_{C-H}$=ca. 160 Hz), 125.5 (d, J$_{C-H}$=ca. 160 Hz), 124.2 (q, J$_{C-F}$=272 Hz, CF$_3$), 123.8 (dd, J$_{C-H}$=ca. 160 Hz, J$_{C-H}$=9 Hz), 121.5 (dd, J$_{C-H}$= 160 Hz, J$_{C-H}$=9 Hz), 38.9 (td, J$_{C-H}$=129 Hz, $^2$J$_{C-H}$=7 Hz, CH$_2$). C, H analysis: Anal. Found (Calcd.): C, 74.05 (73.84); H, 4.15 (4.26).

EXAMPLE 12

Preparation of Bis(2-(4-trifluoromethylphenyl) indenyl) zirconium dichloride, Catalyst H (Ligand 4).

N-Butyllithium (1.6M in hexanes, 2.5 mL, 4.0 mmol) was added dropwise to a suspension of 2- (4-(trifluoromethyl) phenyl)indene (1.02 g, 3.9 mmol) in Et$_2$O (10 mL). The yellow-orange solution was stirred at ambient temperature for 20 min after which time the solvent was removed in vacuo. In a drybox, to the resulting green-white solid was added ZrCl$_4$ (462 mg, 2.0 mmol). The solids were cooled to −78° C. and methylene chloride (50 mL) was slowly added. The yellow suspension was warmed to room temperature and kept there overnight. The orange solution was then filtered over a plug of Celite and the Celite was washed with CH$_2$Cl$_2$ until the washings were colorless (ca. 40 mL). The product was recrystallized from toluene at −18° C. Yield: 471 mg (35%). $^1$H NMR (C$_6$D$_6$, 23° C., 400 MHz): $^d$ 7.36 (d, J=8 Hz, 4H); 7.12 (dd, J=6.5 Hz, J=3.1 Hz, 4H); 7.09 (d, J=8 Hz, 4H); 6.86 (dd, J=6.4 Hz, J=3 Hz, 4H); 6.21 (s, 4H, Cp-H). C, H analysis: Anal. Found (Calcd.): C, 56.42 (56.47); H, 3.00 (2.96).

EXAMPLE 13

Preparation of 2-(4-methylphenyl)indene (Ligand 5)

A 3-neck 500-mL round-bottomed flask fitted with a condenser and an addition funnel was charged with 2.66 g (0.11 mol) of Mg turnings and 20 mL of anhydrous Et$_2$O. Slow addition of a solution of 15.0 g (0.09 mol) of 4-bromotoluene in Et$_2$O (100 mL), followed by refluxing for 30 min, gave an orange solution of the aryl Grignard reagent. The solution was cooled to room temperature, filtered over a plug of Celite and the solvent was removed in vacuo from the filtrate. Toluene (40 mL) was added and the solution cooled to 0° C. whereupon a solution of 2-indanone (9.27 g, 0.07 mol) in toluene (70 mL) was added dropwise to give an orange slurry. This mixture was warmed to room temperature and stirred for an additional 3 hours. After cooling to 0° C., it was quenched with 150 mL of water. Hexane (150 mL) was added and the reaction mixture neutralized with 5M HCl. The organic layer was separated, and the aqueous layer was extracted with two 50-mL portions of hexane. The combined organic layers were washed with two 50-mL portions of brine and dried over anhydrous magnesium sulfate. After filtration over Celite, the solvent was removed in vacuo yielding 2-(4-methyl)phenylindanol as a solid.

Under argon, this alcohol and p-toluenesulfonic acid monohydrate (200 mg) were dissolved in benzene (200 mL) and the solution was heated to reflux for 2 hours. After cooling to room temperature, the solvent was removed in vacuo and the product, 2-(4-methylphenyl)indene, was recrystallized from Et$_2$O/hexane. Yield: 7.17 g (50%). $^1$H NMR (CDCl$_3$, 23° C., 400 MHz): $^d$ 7.56 (d, J=8 Hz, 2H); 7.49 (d, J=8 Hz, 1H); 7.41 (d, J=7 Hz, 1H); 7.36–7.14 (overlapping signals integrating for 5H); 3.80 (s, 2H, CH$_2$); 2.40 (s, 3H, CH$_3$) $^{13}$C{H} NMR (CDCl$_3$, 23° C., 100 MHz): $^d$ 146.5 (s), 145.5 (s), 143.0 (s), 137.4 (s), 133.2 (s), 129.4 (s); 126.6 (s), 125.64 (s), 125.57 (s), 124.5 (s), 123.6 (s), 120.8 (s), 39.0 (s, CH$_2$) 21.3 (s, CH$_3$). C, H analysis: Anal. Found (Calcd.): C, 93.25 (93.16); H, 7.00 (6.84).

EXAMPLE 14

Preparation of Bis(2-(4-methylphenyl) indenyl) zirconium dichloride, Catalyst I (Ligand 5)

N-Butyllithium (1.6M in hexanes, 4.2 mL, 6.7 mmol) was added dropwise to a solution of 2-(4-methyl)phenyl)indene (1.323 g, 6.4 mmol) in Et$_2$O (20 mL). The red-orange solution was stirred at ambient temperature for 30 min after which time the solvent was removed in vacuo. In a drybox, to the resulting solid was added ZrCl$_4$ (0.754 g, 3.2 mmol).

The solids were cooled to −78° C. and methylene chloride (60 mL) was slowly added. The solution was warmed to room temperature and kept there overnight. The resulting yellow-orange turbid solution was then filtered over a plug of Celite and the Celite was washed with $CH_2Cl_2$ until the washings were colorless (ca. 60 mL). The product was recrystallized from $CH_2Cl_2$/hexane at −18° C. Yield: 577 mg (31%). $^1H$ NMR ($C_6D_6$, 23° C., 400 MHz): $^d$ 7.36 (d, J=8 Hz, 4H); 7.11 (m, 4H); 7.02 (d, J=8 Hz, 4H); 6.92 (m, 4H); 6.43 (s, 4H, Cp-H); 2.17 (s, 6H, $CH_3$). C, H analysis (crystallizes with ½ $\underline{C}H_2Cl_2$): Anal. Found (Calcd.): C, 63.21 (63.46); H, 4.41 (4.42).

EXAMPLE 15

Preparation of 2-(3,5-dimethylphenyl) indene
(Ligand 6)

A 3-neck 500-mL round-bottomed flask fitted with a condenser and an addition funnel was charged with 1.86 g (77 mmol) of Mg turnings and 15 mL of anhydrous $Et_2O$. Slow addition of a solution of 9.9 g (53 mmol) of 3,5-dimethylbromobenzene in $Et_2O$ (60 mL), followed by refluxing for 1 hour, gave an orange solution of the aryl Grignard reagent. The solution was cooled to room temperature, filtered over a plug of Celite and the solvent was removed in vacuo from the filtrate. Toluene (30 mL) was added and the solution cooled to 0° C. whereupon a solution of 2-indanone (5.67 g, 43 mmol) in toluene (50 mL) was added dropwise to give an orange slurry. This mixture was warmed to room temperature and stirred for an additional 9 hours. After cooling to 0° C., it was quenched with 100 mL of water. Hexane (150 mL) was added and the reaction mixture neutralized with 5M HCl. The organic layer was separated, and the aqueous layer was extracted with two 40-mL portions of hexane. The combined organic layers were washed with two 40-mL portions of brine and dried over anhydrous magnesium sulfate. After filtration over Celite, the solvent was removed in vacuo yielding 2-(3,5-dimethyl)phenylindanol as a very viscous oil.

Under argon, this alcohol and p-toluenesulfonic acid monohydrate (213 mg) were dissolved in benzene (100 mL) and the solution was heated to reflux for 2 hours. After cooling to room temperature, the solvent was removed in vacuo and the product, 2-(3,5-dimethylphenyl)indene, was recovered by sublimation (120° C., high vacuum). Yield: 3.51 g (37%). $^1H$ NMR ($CDCl_3$, 23° C., 400 MHZ): $^d$ 7.52 (d, J=7 Hz, 1H); 7.44 (d, J=7 Hz, 1H); 7.4–7.1 (overlapping signals integrating for 5H); 6.98 (s, 1H); 3.82 (s, 2H, $\underline{C}H_2$); 2.41 (s, 6H, $CH_3$'s ). $^{13}C$ NMR ($CDCl_3$, 23° C., 100 MHz): $^d$ 146.7 (s), 145.5 (s), 143.1 (s), 138.1 (s), 135.8 (s), 129.3 (d, $J_{C-H}$=155 Hz), 126.5 (dd, $J_{C-H}$=159 Hz, $J_{C-H}$=7 Hz), 126.2 (d, $J_{C-H}$=165 Hz), 124.6 (dd, $J_{C-H}$=159 Hz, $J_{C-H}$=7 Hz), 123.6 (d, $J_{C-H}$=155 Hz), 123.5 (d, $J_{C-H}$=156 Hz), 120.8 (dd, $J_{C-H}$=159 Hz, $J_{C-H}$=8 Hz), 39.1 (td, $J_{C-H}$=129 Hz, $^2J_{C-H}$=6 Hz, $\underline{C}H_2$), 21.4 (q, $J_{C-H}$=156 Hz, $CH_3$). C, H analysis: Anal. Found (Calcd.): C, 92.88 (92.68); H, 7.32 (7.32).

EXAMPLE 16

Preparation of Bis(2-(3,5-dimethylphenyl) indenyl) zirconium dichloride, Catalyst J, (Ligand 6).

N-Butyllithium (1.6M in hexanes, 2.8 mL, 4.5 mmol) was added dropwise to a solution of 2-(3,5-dimethyl)phenyl) indene (0.945 g, 4.3 mmol) in $Et_2O$ (10 mL). The yellow-orange solution was stirred at ambient temperature for 45 min after which time the solvent was removed in vacuo. In a drybox, to the resulting clear yellow solid was added $ZrCl_4$ (0.504 g, 2.2 mmol). The solids were cooled to −78° C. and methylene chloride (50 mL) was slowly added. The yellow suspension was warmed to room temperature and kept there overnight. The resulting brown-orange solution was then filtered over a plug of Celite and the Celite was washed with $CH_2Cl_2$ until the washings were colorless (ca. 40 mL). The product was recrystallized from toluene at −18° C. Yield; 642 mg (50%). $^1H$ NMR ($C_6D_6$, 23° C., 400 MHz): $^d$ 7.22 (S, 4H); 7.19 (m, 4H); 7.00 (m, 4H); 6.85 (s, 2H); 6.50 (s, 4H, Cp-H); 2.27 (x, 12H). $^{13}C$ NMR ($C_6D_6$, 23° C., 100 MHz): $^d$ 138.2 (brs); 133.9 (S); 133.2 (brs); 130.5 (brd, $J_{C-H}$=ca. 157 Hz); 127.0 (brs); 126.7 (dd, $J_{C-H}$=163 Hz, $^2J_{C-H}$=8 Hz, aromatic C-H); 125.24 ( d, $J_{C-H}$=ca. 163 Hz, aromatic C-H); 125.16 ( dt, $J_{C-H}$=162 Hz, $^2J_{C-H}$=6 Hz, aromatic C-H); 103.9 (dd, $J_{C-H}$=175 Hz, $^2J_{C-H}$=7 Hz, Cp C-H); 21.4 (q, $J_{C-H}$=127 Hz, $CH_3$). C, H analysis: Anal. Found (Calcd.): C, 68.13 (67.98); H, 5.65 (5.03).

EXAMPLE 17

Preparation of Ethylene-1,2-bis(2-phenyl-1-indene)
(Ligand 7)

N-Butyllithium (1.6M in hexanes, 10.1 mL, 16.2 mmol) is added to a solution of 2-phenylindene (3.083 g, 16.0 mmol) in tetrahydrofuran (120 mL) at −78° C. over 20 minutes. The dark orange solution is warmed to room temperature and is stirred for 20 minutes. The solution is recooled to −78° C., and 1,2-dibromoethane (0.70 mL, 1.53 g, 8.1 mmol) is added over 5 minutes. The solution is immediately warmed to 40° C. and is stirred overnight. The reaction is quenched by bubbling HCl gas through the solution for 30 seconds. After removing solvent in vacuo, the solid is extracted with 120 mL of methylene chloride, filtered over Celite, and dried in vacuo. This intermediate product consists predominantly of unreacted 2-phenyl-1-indene, 2-phenyl-1-spirocyclopropylindene, and a small amount of the desired ethylene-bridged ligand. The solid and NaH (332 mg, 13.8 mmol) are placed in a 100 mL Schlenk tube under argon. 2-Methoxyethyl ether (50 mL) is added, and the green solution is refluxed at 160° C. and 18-crown-6 (770 mg, 2.9 mmol) is added. The reaction is refluxed at 160° C. for 4 hours, cooled to room temperature, and deionized water (30 mL) is added. The cream colored precipitate is collected by filtration, dissolved in tetrahydrofuran, dried over $MgSO_4$, and dried in vacuo. Unreacted 2-phenylindene and 2-phenyl-1-spirocyclopropylindene is removed from the product by sublimation at 130° C. The remaining orange solid is recrystallized from tetrahydrofuran (≈5 mL) to give an orange solid (1.75 g, 52.5%).

EXAMPLE 18

Preparation of rac/meso-Ethylene-1,2-bis (2-phenyl-1-indenyl) zirconium dichloride, Catalyst K, L
(Ligand 7)

N-Butyllithium (2.5M in hexanes, 2.10 mL, 5.3 mmol) is added to a solution of ethylene-1,2-bis(2-phenyl-1-indene) (1.061 g, 2.6 mmol) in toluene (35 mL) at 0° C. over 2 min. The solution is warmed to 80° C. and is stirred for 1 hour. The solution becomes cloudy, and is allowed to cool to room temperature for 18 hours, and filtered over a medium frit packed with Celite. Solvent is removed in vacuo, and the remaining orange solid is recrystallized at −20° C. from a mixture of diethyl ether (18 mL) and tetrahydrofuran (2 mL)

in a Schlenk tube containing a vial of pentane (12 mL). The rac- and meso-isomers of ethylene-1,2-bis(2-phenyl-1-indenyl)zirconium dichloride were obtained as two types of crystals, orange cubes and yellow plates. A small sample (1.8 mg) of the orange cubes were manually separated from the mixture in air and were characterized by $^1$H NMR as the racemic isomer K (400 MHz, 20° C., $C_6D_6$): $^d$ 7.75 (d, J=8.2 hz, 4H), 721 (m, 4H), 7.07 (m, 2H), 6.82 (s, 2H), 6.66 (m, 2H), 6.21 (d, J=8.8 Hz, 2H), 3.77 (d, J=8.8, 2H), 3.14 (d, J =8.8, 2H). This product was characterized as the racemic-isomer. The remaining mixture of yellow and orange crystals was also characterized by $^1$H NMR. In addition to the rac-isomer shifts, those of the meso-isomer were present. $^1$H NMR (400 MHz, 20° C., $C_6D_6$): $^d$ 7.51 (d, 7.7 Hz, 4H), 7.1–7.2 (m, 2H), 7.07 (m, 2H), 6.86–6.94 (m, 8H), 6.73 (m, 2H), 6.61 (s, 2H), 3.4401.64 (m, 4H0. The original mixture was determined to contain 56.1% of the rac-isomer and 43.9% meso-isomer, as determined by integration of the shifts at $^d$ 6.82 (rac-Cp-H) and 6.61 (meso-Cp-H). Characteristic ethylene-bridge shifts were characterized by $^{13}C\{^1H\}$ NMR (100 MHz, 20° C., $C_6D_6$): 27.81, 26.71.

II. POLYMERIZATION

This section gives examples of polymer preparation using catalysts of this invention, and compares them to bridged catalysts. The physical testing of the polymers is set forth in Section III below. Note: two types of MAO co-catalysts were used, one type is methylalumoxane containing predominantly methyl groups as sold by Ethyl Corp. or Schering and the other, identified as AKZO type 4A, has 11.9 mole % butyl groups and 86.7% methyl groups.

GENERAL PROCEDURES: OLEFIN POLYMERIZATION

METHOD A

In a nitrogen filled drybox, a 80 mL Fischer-Porter bottle containing a magnetic stirring bar is charged with the subject metallocene catalyst, e.g., bis(2-phenylindenyl)zirconium dichloride (catalyst A, Ex 2) (6 mg, 11 mmol), and dry Scheringbrand methylaluminoxane (713 mg, 12.3 mmol). Once removed from the drybox, toluene (20 mL) is transferred to the reactor using a stainless-steel cannula needle. After the degassing the reaction solution by freezing in a liquid nitrogen bath under vacuum, approximately 8 mL of propylene are added to the reactor at −78° C. The cooling bath is dropped, and the reaction mixture is allowed to warm to 0° C. After 10 minutes, the reaction solution becomes very viscous, and the reactor is immediately vented. The polymer is precipitated by the addition of methanol (10 mL), collected by filtration, and dried overnight at 30° C. The polymer is extracted into refluxing toluene, filtered, and dried in vacuo to yield a rubbery white solid polymer (in the case of bis(2-plenyl indenyl) zironium dichloride, 5.35 g). Activity: 2.9×10$^6$ gpp/molZr.h. The mmmm pentad content by $^{13}$C NMR is 11.6%. A $M_w$ of 209,000 and $M_w/M_n$ of 3.0 is determined by GPC versus polystyrene.

METHOD B

In a nitrogen filled drybox, a 300-mL stainless-steel Parr reactor equipped with a mechanical stirrer was charged with dry methylaluminoxane (MAO Type 4 Akzo, dried>24 h) dissolved in toluene. A 50-mL pressure tube was charged with the corresponding metallocene catalyst dissolved in 20 mL of toluene. The reactor was purged several times by pressurizing and venting. It was then brought to the appropriate pressure (until saturation) and temperature with stirring. The pressure tube containing the metallocene was pressurized to 200 psi with nitrogen. Once the MAO solution was saturated with propylene the catalyst solution was injected into the reactor at the appropriate temperature. After stirring for 1 h, the polymerization was quenched by injecting methanol (10 mL). The autoclave was then slowly vented and opened. The polymer was precipitated by the addition of methanol (400 mL), collected by filtration, and dried overnight at ambient temperature.

METHOD C

A 300-mL stainless-steel autoclave equipped with a stirrer and catalyst addition tube is heated at 80° C. for 12 hours and then brought into an argon-filled inert atmosphere glove box to cool to room temperature.

A solution of the catalyst is prepared by adding 0.0027 g (3.0×10$^3$ mmole) catalyst E (Ex 7) to 2 mL toluene and then stirring to dissolve the solid. This solution is placed in the catalyst addition tube. MAO cocatalyst (0.270 g, 4.6 mmole) is placed in the autoclave and the unit is capped and brought out of the glove box.

Propylene (75 grams) is passed through a bed of 3 Å molecular sieves followed by a bed of Q5 reagent and then added to the autoclave at 0° C. The autoclave is warmed to 50° C. and the catalyst addition tube is then pressurized with argon. The contents of the catalyst addition tube are added to the autoclave by use of a ball valve and the resulting mixture stirred at 500 RPM at a temperature of 50° C. for 1 hour. After this time, stirring is discontinued and acidified methanol is added to the reactor under pressure via a Milton Roy pump to quench the reaction. The excess propylene is slowly vented from the autoclave. The autoclave is opened and the resulting solid is collected and dried in a vacuum oven at 70° C. for 12 hours affording 12.2 grams of a white elastic polymer having a melting point of 151° C. ($\Delta H^f$=0.2 cal/g), an isotactic content of 30.6%, a molecular weight ($M_w$), of 285,000 and $M_w/M_n$=3.0. The product exhibits a XRD crystallinity of 18%.

METHOD D

A two gallon stainless autoclave equipped with a stirrer and catalyst addition tube is purged with nitrogen followed by dry propylene. The vessel is then rinsed with a solution of 2 Kg dry toluene and 20 g of a solution of MAO in toluene (6.4% Al). The rinse solution is drained and 20 g of a MAO solution (6.4% Al) is added to the reactor.

A solution of the catalyst is prepared by adding 0.03 g (3.0×10$^3$ mMole) catalyst A (Ex 2) to 10 mL toluene and then stirring to dissolve the solid. This solution is added to the catalyst addition tube via syringe.

Propylene (2.3 Kg) is passed through a bed of 3 Å molecular sieves followed by a bed of Q5 reagent and then added to the autoclave at 10° C. The autoclave is warmed to 15° C. and the catalyst addition tube is then pressurized with propylene. The contents of the catalyst addition tube are added to the autoclave by use of a ball valve and the resulting mixture stirred at 250 RPM at a temperature of 18–20° C. for 3 hours. After this time, hexane (2 Kg) is added to the reactor which is then pressurized to 200 psi with nitrogen. The reactor is drained into a vessel containing 1.6 Kg hexane and 400 g isopropanol. The solvent is allowed to evaporate from the polymer under atmospheric pressure. Final drying is done in a vacuum oven at 70° C. for 12 hours affording 362 grams of a white elastic polymer having a melting point of 151° C. ($\Delta H^f$=0.2 cal/g), an isotactic content of 32.1%, a molecular weight ($M_w$) of 345,000 and $M_w/M_n$= 3.5.

EXAMPLE 19

Typical Olefin Polymerization—Ethylene

In a nitrogen filled drybox, a 350 mL stainless-steel autoclave equipped with a mechanical stirrer is charged with bis(2-phenylindenyl) zirconium dichloride (3 mg, 5.5 mmol) and dry Ethyl-brand methylaluminoxane (319 mg, 5.5 mmol). Once removed from the drybox, the autoclave is evacuated at room temperature for 15 minutes, and toluene (100 mL) is drawn into the reactor through a stainless-steel cannula needle. After stirring the reaction solution for 10 minutes at 25° C., ethylene is added to the reactor at a pressure of 130 psig. After stirring for 7 minutes, temperature control becomes difficult and the reaction is quenched by injecting methanol (10 mL) at 250 psig. The autoclave is vented slowly and opened. The polymer is precipitated by the addition of methanol (150 mL), collected by filtration, and dried overnight at 30° C. Crude yield: 14.2 g. Activity: 2.2×10$^7$ gpp/molZr.h. An $M_w$ of 372,000 and $M_w/M_n$ of 27.5 is determined by GPC versus polyethylene standards.

EXAMPLES 20–23

Polymer Structure as a Function of Reaction Temperature

In a nitrogen filled drybox, a 100 mL Schlenk tube containing a magnetic stirring bar was charged with bis(2-phenylindenyl)zirconium dichloride (Catalyst A, Ex 2) (6 mg, 11/mmol) and dry Schering-brand methylaluminoxane (660 mg, 11 mmol). Once removed from the drybox, toluene (80 mL) was transferred to the flask thermostated at the appropriate temperature using a stainless-steel cannula needle. After aging for 10 minutes at the desired temperature, the bright yellow solution was placed under partial vacuum and propylene was added to the flask at a pressure of 0.5 psig. After stirring for 15 minutes, the polymerization was quenched by the addition of methanol (20 mL). The polymer was collected by filtration, and dried overnight at 30° C. The polymer was extracted into refluxing toluene, filtered, and dried in vacuo to yield rubbery white solids in Examples 21–23, and a clear tacky solid in the case of Example 20. The polypropylene of Example 23 exhibited melting points of 56° C. and 140° C. The results are summarized in Table 1.

TABLE 1

Propylene Polymerization at Various Temperatures[a]

| Example | Temp. (° C.) | Pressure (psig) | Time (min) | Productivity (× 10$^5$)[b] | $M_w^c$ (× 10$^3$)[c] | $M_w/M_n$ | % mmmm[d] | BI[e] |
|---|---|---|---|---|---|---|---|---|
| 20 | 45 | 0.5 | 15 | 1.9 | 24 | 2.8 | 6.3 | 5.02 |
| 21 | 25 | 0.5 | 15 | 3.1 | 67 | 2.7 | 9.2 | 5.32 |
| 22 | 0 | 0.5 | 15 | 7.1 | 183 | 2.6 | 12.3 | 5.67 |
| 23 | −25 | 0.5 | 15 | 11.0 | 330 | 2.2 | 16.1 | 6.12 |

[a]Catalyst A [Zr] = 1.0 × 10$^{-4}$ M, [Al]/[Zr] = 1033.
[b]gPP/mol Zr · h.
[c]Determined by GPC vs. polystyrene.
[d]Determined by $^{13}$C NMR spectroscopy.
[e]BI = isotactic block index = 4 + 2 [mmmm]/[mmmr].

EXAMPLES 24–27

Polymer Microstructures as a Function of Reaction Pressure at 0° C.

In a nitrogen drybox, a 300 mL stainless steel autoclave equipped with a mechanical stirrer was charged with bis(2-phenylindenyl)zirconium dichloride (catalyst A, Ex 2) (3 mg, 5.5 mmol) and dry Schering-brand methylaluminoxane (319 mg, 5.5 mmol) Once removed from the drybox, the autoclave was evacuated at room temperature for 15 minutes, and toluene (100 mL) was drawn into the reactor through a stainless-steel cannula needle. After stirring the reaction solution for 10 minutes at 0 ° C., propylene was added to the reactor to the appropriate pressure. After stirring for 10 minutes, the polymerization was quenched by injecting tetrahydrofuran (10 mL). The autoclave was slowly vented and opened. The polymer was precipitated by the addition of methanol (150 mL), collected by filtration, and dried overnight at 30° C. The polymer was extracted into refluxing toluene, filtered, and dried in vacuo to yield a white rubbery solid. The results were summarized in Table 2.

TABLE 2

Propylene Polymerization at Various Pressures at 0° C.[a]

| Example | Pressure (psig) | Time (min) | Productivity (× 10$^5$)[b] | $M_w^c$ (× 10$^3$) | $M_w/M_n$ | % mmmm[d] | BI[e] |
|---|---|---|---|---|---|---|---|
| 24 | 5 | 10 | 2.7 | 213 | 1.5 | 11.6 | 5.58 |
| 25 | 25 | 10 | 6.2 | 395 | 1.9 | 13.2 | 5.87 |

TABLE 2-continued

Propylene Polymerization at Various Pressures at 0° C.[a]

| Example | Pressure (psig) | Time (min) | Productivity ($\times 10^5$)[b] | $M_w$[c] ($\times 10^3$) | $M_w/M_n$ | % mmmm[d] | BI[e] |
|---|---|---|---|---|---|---|---|
| 26 | 50 | 10 | 10.4 | 540 | 1.7 | 15.7 | 5.93 |
| 21 | 75 | 10 | 17.3 | 604 | 1.8 | 17.4 | 6.19 |

[a]Catalyst A [Zr] = $5.5 \times 10^{-5}$ M, [Al]/[Zr] = 1000.
[b]gPP/mol Zr · h.
[c]Determined by GPC vs. polystyrene.
[d]Determined by $^{13}$C NMR spectroscopy.
[e]BI = isotactic block index = 4 + 2 [mmmm]/[mmmr].

EXAMPLES 28–32

Polymer Microstructures as a Function of Reaction Pressure at 25° C.

Polymerizations were carried out according to Method B, and results are presented in Table 3.

TABLE 3

Propylene Polymerization at Various Pressures at 25° C.[a]

| Example | Pressure (psig) | Time (min) | Productivity ($\times 10^{-5}$)[b] | $M_w$[b] ($\times 10^{-3}$) | $M_w/M_n$ | % m[c] | % mmmm[c] | BI[d] |
|---|---|---|---|---|---|---|---|---|
| 28 | 25 | 60 | 3.8 | 179 | 3.0 | 62 | 20 | 6.8 |
| 29 | 35 | 60 | 5.1 | 203 | 3.2 | 64 | 22 | 7.0 |
| 30 | 50 | 60 | 8.8 | 241 | 3.5 | 66 | 26 | 7.6 |
| 31 | 75 | 60 | 17.1 | 272 | 4.0 | 70 | 33 | 8.4 |
| 32 | 90 | 60 | 24.0 | 369 | 3.9 | 73 | 32 | 7.9 |

[a]Catalyst A, [Zr] = $5.5 \times 10^{-5}$ M, [Al]/[Zr] = 1000.
[b]gPP/mol Zr · h.
[b]Determined by GPC vs. polypropylene.
[c]Determined by $^{13}$C NMR spectroscopy.
[d]BI = Isotactic Block Index = 4 + 2 [mmmm]/[mmmr]

EXAMPLE 33

In a nitrogen filled drybox, a 80 mL Fischer-Porter bottle containing a magnetic stirring bar is charged with bis(2-phenylindenyl)zirconium dichloride (6 mg, 11 mmol) and dry Schering-brand methylaluminoxane (660 mg, 11 mmol). Once removed from the drybox, toluene (50 mL) is transferred to the reactor using a stainless-steel cannula needle. The reaction solution is placed under partial vacuum at 78° C., then is allowed to warm to 0° C. Propylene is added to the reactor at 36 psig for 15 minutes. The reactor is immediately vented, and the reaction solution is poured into methanol (150 mL). The polymer is collected by filtration and dried overnight at 30° C. Crude yield: 4.50 g. The polymer is extracted into refluxing toluene, filtered, and dried in vacuo to yield 2.20 g of a white rubbery solid. Activity: $8.0 \times 10^5$ gpp/molZr.h. The mmmm pentad content by $^{13}$C NMR is 14.1% A $M_w$ of 211,000 and $M_w/M_n$ of 2.4 is determined by GPC versus polystyrene. Results are shown in Table 4.

TABLE 4

Propylene Polymerization at Higher Catalyst Concentration[a]

| Example | Temp. (° C.) | Pressure (psig) | Time (min) | Productivity ($\times 10^5$)[b] | $M_w$[c] ($\times 10^3$) | $M_w/M_n$ | % mmmm[d] | BI[e] |
|---|---|---|---|---|---|---|---|---|
| 21 | 0 | 36 | 15 | 8.0 | 211 | 2.4 | 14.1 | 5.94 |
|  |  |  |  |  |  |  |  | 4.1 |

[a]catalyst [Zr] = $2.2 \times 10^{-4}$ M, [Al]/[Zr] = 1033.
[b]gPP/mol Zr · h.
[c]Determined by GPC vs. polystyrene.
[d]Determined by $^{13}$C NMR spectroscopy.
[e]isotactic block index = 4 + 2 [mmmm]/[mmmr].

EXAMPLE 34 a, b

Polymer Microstructure as a Function of MAO Type

In a nitrogen filled drybox, a 300 mL stainless-steel autoclave equipped with a mechanical stirrer was charged with bis(2-phenylindenyl)zirconium dichloride (3 mg, 5.5 mmol), (catalyst A, Ex 2), and methylaluminoxane (270 mg, 4.7 mmol). In Example 34a dry Shering MAO was used, and in Example 34b AKZO modified MAO was used (See Table 4 below). Once removed from the drybox, the autoclave was evacuated at room temperature for 15 minutes. After filling the reactor with argon, toluene (50 mL) was drawn into the reactor through a stainless-steel cannula needle. After stirring the reaction solution for 5 minutes at 30° C., the reactor was cooled to −38° C. and propylene was added to the reactor at a pressure of 40 psig. The temperature increases to −18° C. over 1 minute, where it was stirred for two hours. The polymerization was quenched by injecting methanol (10 mL), at 250 psig. The autoclave was vented slowly and opened. The polymer was precipitated by the addition of methanol (150 mL), collected by filtration, and dried overnight at 30° C. The polymer was extracted into refluxing toluene, filtered and dried in vacuo to yield a white rubbery solid. The results are summarized in Table 5.

by the addition of methanol (10 mL). The crude polymer was collected by filtration, and dried overnight at 30° C. to give 7.45 g of a white solid. This solid was extracted with pentane and filtered, giving a pentane soluble (1.29 g) and insoluble (6.16 g) fraction. As this polymer can be fractionated with pentane, it is clearly a polymer blend, not a block copolymer.

The mmmm pentad content of the pentane soluble fraction, as determined by $^{13}C$ NMR spectroscopy, was 6.2%, and is thus clearly atactic. A $M_w$ of 124,000 and $M_w/M_n$ of 1.7 was determined by GPC versus polystyrene. This material is an extremely interesting, high molecular weight atactic polypropylene which is rubbery and slightly tacky, with high cohesion and good adhesion to a glass surface.

Residual cocatalyst was removed from the pentane insoluble fraction by extraction with toluene to yield 4.58 g

TABLE 5

Propylene Polymerization with Various Methylaluminoxanes[a]

| Example | MAO Type | Time (min) | Productivity ($\times 10^5$)[b] | $M_w^c$ ($\times 10^3$) | $M_w/M_n$ | % mmmm[d] | BI[e] |
| --- | --- | --- | --- | --- | --- | --- | --- |
| 34a | Schering | 120 | 14.0 | 1,650 | 1.86 | 17.4 | 6.38 |
| 34b | Akzo-Modified | 120 | 6.5 | 871 | 2.34 | 20.0 | 6.73 |

[a]A Catalyst, [Zr] = 1.1 × 10$^{-4}$ M, [Al]/[Zr] = 855, −18° C., 40 psig propylene.
[b]gPP/mol Zr · h.
[c]Determined by GPC vs. polystyrene.
[d]Determined by $^{13}C$ NMR spectroscopy.
[e]BI = isotactic Block Index = 4 + 2 [mmmm]/[mmmr].

EXAMPLE 35

In a nitrogen filled drybox, a 200 mL Fischer-Porter bottle containing a magnetic stirring bar is charged with Akzo type 4A methylaluminoxane (7.4% Al, 1.69 g, 4.6 mmol) and bis(2-phenylindenyl)zirconium dichloride (3 mg, 5.5 mmol). Once removed from the drybox, toluene (50 mL) is transferred to the reactor using a stainless-steel cannula needle. After cooling to −18° C., the reactor is pressurized with 50 psig of propylene. Under these conditions propylene is a liquid. After stirring for 45 minutes, the motion of the magnetic stir bar becomes impeded due to polymer formation. After 2 hours and 15 minutes the reaction is quenched by injecting methanol (10 mL). The polymer is precipitated by the addition of methanol (50 mL), collected by filtration and dried overnight at 30° C. Crude yield: 9.26 g of a white rubbery solid. Activity: 5.6×10$^5$ gpp/molZr.h. The mmmm pentad content by $^{13}C$ NMR is 28.1% A $M_w$ of 889,000 and $M_w/M_n$ of 2.07 is determined by GPC versus polystyrene.

EXAMPLE 36

Comparative Example: Bridged Metallocene Produces Polymer Blend, Not Polymer Block In a nitrogen filled drybox, a 100 mL Schlenk tube containing a magnetic stirrer bar is charged with rac/meso-ethylene-1,2-bis(2-phenyl-1-indenyl)zirconium dichloride (5 mg, 8.8 mmol) and dry Schering-brand methylaluminoxane (1.04 g, 17.9 mmol). Once removed from the drybox, toluene (50 mL) is transferred to the reactor using a stainless-steel cannula needle. After aging for 5 minutes at 20° C., the green solution is placed under partial vacuum and propylene is added to the reactor at a pressure of 0.5 psig. The solution turns yellow-orange after 5 minutes. After stirring for 2 hours at 20° C., the polymerization is quenched of a white powder. The mmmm pentad content of the pentane insoluble fraction, as determined by $^{13}C$ NMR spectroscopy, was 87.7%, indicative of an isotactic polypropylene. A $M_w$ of 124,000 and $M_w/M_n$ of 1.5 was determined by GPC versus polystyrene. A melting point of 142° C. ($\Delta H^f$=50.3 J/g) was observed by DSC.

EXAMPLE 37

Comparative Example: Racemic Ethylene-Bridged 2-Phenylindene Catalyst Produces Isotactic Polypropylene (a) The racemic and meso-isomers of ethylene-1,2-bis(2-phenyl-1-indenyl)zirconium dichloride were obtained as two types of crystals, orange cubes and yellow plates. The orange cubes were characterized as the racemic isomer and were separated from the meso isomer (yellow plates) manually in air by visual recognition and using tweezers to physically separate into like groups.

(b) In a nitrogen filled drybox, a 100 mL Schlenk tube containing a magnetic stirring bar is charged with rac-ethylene-1,2-bis(2-phenyl-1-indenyl) zirconium dichloride (5 mg, 8.8 mmol) and dry Schering brand methylaluminoxane (1.04 g, 17.9 mmol). Once removed from the drybox, toluene (50 mL) is transferred to the reactor using a stainless-steel cannula needle. After aging for 5 minutes at 20° C., the green solution is placed under partial vacuum and propylene is added to the reactor at a pressure of 0.5 psig. The solution turns yellow-orange after 5 minutes. After stirring for 2 hours at 20° C., the polymerization is quenched by the addition of methanol (10 mL). The polymer is collected by filtration, and dried overnight at 30° C. Crude yield: 8.85 g. The polymer is extracted into refluxing toluene, filtered, and dried in vacuo to yield a white powder. Activity: 5.0×10$^5$ GPP/molZr.h. The mmmm pentad content by $^{13}$C NMR is 68.1%. A $M_w$ of 16,800 and $M_w/M_n$ of 2.0 is determined by GPC versus polystyrene. A melting point of 113° C. ($\Delta H^f$=30.7 J/g) is observed by DSC. This polymer was clearly isotactic.

EXAMPLE 38

Comparison—Polymer Structure as a Function of Metal Type

In a nitrogen filled drybox, a 300 mL stainless-steel autoclave equipped with a mechanical stirrer was charged with the appropriate catalyst A (Zr) or C (Hf), methylaluminoxane and toluene (100 mL). Once removed from the drybox, the autoclave was warmed to 30° C., and propylene was added to the reactor at a pressure of 75 psig. After stirring for 10 minutes, the polymerization was quenched by injecting methanol (10 mL) at 250 psig. The autoclave was vented slowly and opened. The polymer was precipitated by the addition of methanol (150 mL), collected by filtration, and dried overnight at 30° C. The polymer was extracted into refluxing toluene, filtered, and dried in vacuo to yield a white rubbery solid. The results are summarized in Table 6; all pressures are 75 psig.

TABLE 6

Propylene Polymerization with Catalysts Containing Different Metals

| Example | Catalyst | Temp (° C.) | Time (min) | Productivity (× 10$^5$)$^a$ | $M_w^b$ (× 10$^3$) | $M_w/M_n$ | % mmmm$^c$ | BI$^f$ |
|---|---|---|---|---|---|---|---|---|
| 38a | A$^d$ | 30 | 10 | 17.0 | 373 | 1.7 | 15.6 | 6.42 |
| 38b | C$^e$ | 30 | 10 | 15.5 | 170 | 1.9 | 7.7 | 5.12 |

$^a$gPP/mol Zr · h.
$^b$Determined by GPC vs. polystyrene.
$^c$Determined by $^{13}$C NMR spectroscopy.
$^d$[Zr] = 5.5 × 10$^{-5}$ M, [Al]/[Zr] = 1000.
$^e$[Hf] = 2.4 × 10$^{-4}$ M, [Al]/[Hf] = 958.
$^f$BI = Isotactic Block Index = 4 + 2 [mmmm]/[mmmr].

EXAMPLES 39, 40

Influence of Ligand on Structure of Polypropylene

EXAMPLE 39

In a nitrogen filled drybox, a 300-mL stainless-steel Parr reactor equipped with a mechanical stirrer was charged with dry methylaluminoxane (MAO Type 4 Akzo, dried >24 h) (237 mg, 5.64 mmol) dissolved in 80 mL of toluene. A 50-mL pressure tube was charged with Bis(2-(bis-3,5-(trifluoromethyl)-phenyl)indenyl)zirconium dichloride, Catalyst D, (4.4 mg, 5.39 mmol) dissolved in 20 mL of toluene. The reactor was pressurized to 75 psig of propylene and the pressure slowly released in order to purge the system (3×). The reactor was then saturated with propylene (65 psig) with stirring. The pressure tube containing the metallocene was pressurized to 200 psi with nitrogen. Once the MAO solution was saturated with propylene, the catalyst solution was injected into the reactor at 28° C. The pressure was rapidly raised to 75 psi. After stirring for 1 hour, the polymerization was quenched by injecting methanol (7 mL). The autoclave was then slowly vented and opened. The polymer was precipitated by the addition of methanol (400 mL), collected by filtration, and dried overnight at ambient temperature. Crude yield: 3.2 g. The polymer was extracted into refluxing toluene for >30 h, precipitated in methanol, filtered, and dried in vacuo to yield 1.16 g of tough white rubbery solid. The mmm pentad content by $^{13}$C NMR spectroscopy was 54%. A melting point of 141° C. ($\Delta H^f$= 13.1 J/g) was observed by DSC. The remaining polymer in the thimble was transferred to a new thimble and extracted with refluxing xylenes for >20 hours. The polymer was precipitated in methanol, filtered, and dried in vacuo to yield 0.89 g of tough white rubbery solid. The mmmm pentad content by $^{13}$C NMR spectroscopy was 58%, <BI>=14. Total yield was 2.1 g.

EXAMPLE 40

In a nitrogen filled drybox, a 300-mL stainless-steel Parr reactor equipped with a mechanical stirrer was charged with dry methylaluminoxane (MAO type 4 Akzo, dried for >24 hours) (313 mg, 5.40 mmol) dissolved in 80 mL of toluene. A 50-mL pressure tube was charged with Bis(2-(Bis-3,5-(trifluorormethyl)phenyl)indenyl)zirconium dichloride (4.4 mg, 5.39 mmol), Catalyst D, dissolved in 20 mL of toluene. The reactor was pressurized to 40 psig of propylene and the pressure slowly released in order to purge the system (3×). The reactor was heated to 60° C. and pressured with 75 psig of propylene. The pressure tube containing the catalyst precursor was pressurized to 225 psi with nitrogen. Once the MAO solution was saturated with propylene, the catalyst solution was injected into the reactor at 60° C. After stirring for one hour, the polymerization was quenched by injecting methanol (7 mL). The autoclave was then cooled to ambient temperature and slowly vented. The polymer was precipitated by the addition of methanol (400 mL), collected by filtration, and dried overnight at ambient temperature. Crude yield: 2.23 g. The polyer was extracted into refluxing toluene, precipitated in methanol, filtered, and dried in vacuo to yield 1.77 g of a tacky rubbery solid. Activity: 3.3×10$^5$ GPP/molZr.h. The mmmm pentad content by $^{13}$C NMR spectroscopy was 21% <BI>=6.6. A $M_w$ of 164,000 and $M_w/M_n$ of 3.6 was determined by GPC versus polystyrene. A melting point of 136° C. ($\Delta H^f$=0.9 J/g) was observed by DSC.

EXAMPLES 41–43

Polymerization with Catalyst D: Effect of Propylene Pressure

Polymerizations were carried out according to Method B, and results are presented in Table 7.

TABLE 7

Propylene Polymerization at 25° C. with Catalyst D

| Example | Pressure (psig) | Productivity (× $10^{-5}$)[a] | $M_w$[b] (× $10^{-3}$) | $M_w/M_n$ | % m[c] | % mmmm[c] |
|---|---|---|---|---|---|---|
| 41 | 35 | 5.0 | 243 | 3.2 | 78 | 45 |
| 42 | 50 | 7.3 | 296 | 3.4 | 80 | 53 |
| 43 | 75 | 13.7 | 332 | 3.7 | 86 | 68 |

[a]gPP/mol Zr · h.
[b]Determined by GPC vs. polypropylene.
[c]Determined by $^{13}$C NMR spectroscopy.
[d][Zr] = 5.0 × $10^{-5}$ M, [Al]/[Zr] = 1000.

EXAMPLE 44

In a nitrogen filled drybox, a 300-mL stainless-steel Parr reactor equipped with a mechanical stirrer was charged with dry methylaluminoxane (MAO Type 4 Akzo, dried >24 h) (356 mg, 6.14 mmol) dissolved in 100 mL of toluene. A 50 mL pressure tube was charged with Bis(2-(4-tert-butylphenyl)indenyl)zirconium dichloride, Catalyst F, (4.0 mg, 6.09 mmol) dissolved in 20 mL of toluene. The reactor was pressurized to 75 psig of propylene and the pressure slowly released in order to purge the system (3×). The reactor was then saturated with propylene (75 psig) with stirring. The pressure tube containing the catalyst precursor was pressurized to 200 psi with nitrogen. Once the MAO solution was saturated with propylene the catalyst solution was injected into the reactor at 27° C. After stirring for 1 hours, the polymerization was quenched by injecting methanol (7 mL). The autoclave was then slowly vented and opened. The polymer was precipitated by the addition of methanol (400 mL), collected by filtration, and dried overnight at ambient temperature. Crude yield: 4.11 g. A sample of the polymer (1.98 g) was extracted into refluxing xylenes, precipitated in methanol, filtered, and dried in vacuo to yield 1.77 g of white solid. The mmmm pentad content by $^{13}$C NMR spectroscopy was 27%, <BI>=8.1. A melting point of 133° C. ($\Delta H^f$=1.3 J/g) was observed by DSC.

EXAMPLES 45–49

Influence of Ligand and Metal on Structure of Polypropylene

Polymerizations carried out by Method B. Results are summarized in Table 8.

TABLE 8

Polymerization of Propylene with Catalyst E

| Example | Pressure (psig) | Temp. (° C.) | Productivity (× $10^{-5}$)[a] | $M_w$[b] (× $10^{-3}$) | $M_w/M_n$ | % m[c] | % mmmm[c] |
|---|---|---|---|---|---|---|---|
| 45 | 35 | 25 | 11.3 | 285 | 2.9 | 55 | 12 |
| 46 | 50 | 25 | 13.5 | 330 | 2.4 | 64 | 18 |
| 47 | 75 | 25 | 21.9 | 415 | 2.4 | 58 | 15 |
| 48 | 90 | 25 | 30.5 | 483 | 2.5 | 64 | 21 |
| 49 | 90 | 60 | 43.4 | 62 | 4.2 | 64 | 23 |

[a]gPP/mol Hf · h.
[b]Determined by GPC vs. polypropylene.
[c]Determined by $^{13}$C NMR spectroscopy.
[d][Hf] = 5.0 × $10^{-5}$ M, [Al]/[Hf] = 1000.

EXAMPLES 50–53

Synthesis of High Molecular Weight Atactic Polypropylene

Polymerizations were carried out by Method B. Results are summarized in Table 9.

TABLE 9

Polymerization of Propylene with Catalyst C

| Example | Pressure (psig) | Temp. (° C.) | Productivity[a] (× $10^{-5}$) | $M_w$[b] (× $10^{-3}$) | $M_w/M_n$ | % m[c] | % mmmm[c] |
|---|---|---|---|---|---|---|---|
| 50 | 35 | 20 | 12.1 | 216 | 2.2 | 54 | 9 |
| 51 | 50 | 20 | 11.0 | 530 | 2.2 | 49 | 6 |
| 52 | 75 | 20 | 44.0 | 359 | 2.1 | 54 | 7 |

TABLE 9-continued

Polymerization of Propylene with Catalyst C

| Example | Pressure (psig) | Temp. (° C.) | Productivity[a] (× $10^{-5}$) | $M_w$[b] (× $10^{-3}$) | $M_w/M_n$ | m[c] | % mmmm[c] |
|---|---|---|---|---|---|---|---|
| 53 | 100 | 20 | 46.0 | 496 | 2.1 | 59 | 10 |

[a]gPP/mol Hf · h.
[b]Determined by GPC vs. polypropylene.
[c]Determined by $^{13}$C NMR spectroscopy.
[d][Hf] = 5.0 × $10^{-5}$ M, [Al]/[Hf] = 1000.

EXAMPLES 54–56

Polymerization of 1-Hexene, Borate Cocatalyst

A 20-mL Schlenk flask was charged with 5 mL of toluene, 2 mL of 1-hexane (16 mmol) and 0.0199 mmol of the appropriate zirconium catalyst identified in Table 10 below and stirred for 5 min at 22° C. To this solution was added the cocatalysts, and the mixture was allowed to stir for 20 min. The polymerization was quenched by the addition of methanol. The polymer was isolated by filtration and dried in vacuo overnight to give a sticky clear solid. The results are summarized in Table 10 below.

TABLE 10

Polymerization of 1-Hexane - Comparison of Prior Art to 2-phenylindene dimethyl

| Example | Metallocene Catalyst | Cocatalyst Type | Cocatalyst Conc. (× $10^{-3}$ M) | Productivity[c] (× $10^{5)}$) | $M_w$[d] (× $10^3$) | $M_w/M_n$ |
|---|---|---|---|---|---|---|
| 54 | Ind$_2$ZrMe$_2$[a] | Borate[b] | 2.8 | 4.5 | 3.9 | 1.9 |
| 55 | Catalyst B | Borate[b] | 2.8 | 3.8 | 17.4 | 2.2 |
| 56 | Catalyst B | MAO | 236 | 3.3 | 11.3 | 2.4 |

[a]Ind$_2$ZrMe$_2$ = Bis(indenyl)zirconium dimethyl, [Zr] = 2.7 × $10^{-3}$ M, a prior art catalyst.
[b]Borate = [PhNMe$_2$H]$^+$ B(C$_5$F$_6$)$_4^-$
[c]gPP/(mol ZR × h).
[d]Determined by GPC vs. polystyrene.

III. Mechanical Properties

EXAMPLE 57

Sample Testing

The mechanical properties of samples of polymers produced by representative Examples above were tested and the results shown in Table 11 below. Runs 1 and 2 are polypropylene polymers produced under the conditions of Example 24, with Run 1 being product from Example 24 and Run 2 being a repeat under the same conditions of Example 24. Run 3 is product from a repeat of Example 39. Samples of the polymers (1.6 mm thick×3.2 mm long) were prepared by hot compression molding. The average mechanical properties of the polymers are listed in Table 11. Five polymer samples were tested in Run 1, four in Run 2, and 6 in Run 3.

TABLE 11

Mechanical Properties of Polypropylene Synthesized Using Catalysts A and D with MAO

| Run and No. of Samples | Initial Modulus (psi) | Tensile Strength (psi) | Ultimate Elongation (%) | Tensile Sat (%) |
|---|---|---|---|---|
| Run 1, Av. of 5 Samples | 246 | 443 | 960 | 44 |
| Run 2, Av. of 4 Samples | 193 | 512 | 3070 | 32 |
| Run 3, Av. of 6 Samples | 12,388 | 5040 | 130 | 197 |

EXAMPLE 58

Cold Drawing; Increase in Elastic Recoveries

The polypropylenes of the present invention can also be cold drawn into highly elastic fibers. For example, a 3 mm diameter melt-extruded stereoblock polypropylene fiber prepared from catalyst D by Method C exhibited a very high initial tensile modulus on the order of that of Example 57, Run 3. At higher stress, this material was observed to cold draw, with stress whitening, to a very linearly uniform fiber of about 1 mm diameter, which drawn fiber exhibits a very high strength and excellent elastic recovery even after repeated elongation/relaxation cycles.

INDUSTRIAL APPLICABILITY

Figure 2:
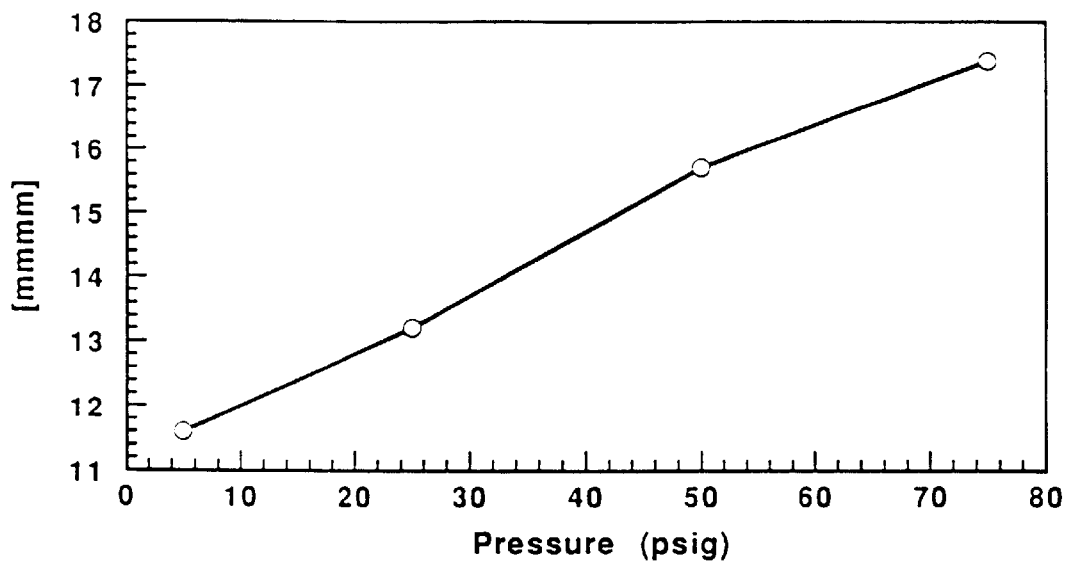
FIG. 2 is a graphic representation of the effect of propylene pressure on the microstructure of polypropylene produced with catalyst A.

A unique and unusual aspect of the catalysts and polymerization process of the present invention with very significant industrial applicability is the effect of catalyst structure and process conditions on the structure and properties of the polypropylenes produced. FIG. 2 displays the effect of polymerization pressure on the istoactic pentad content of propylenes produced with Catalyst A of the present invention. At the polymerization temperature of 0° C., the isotactic pentad content increases from [mmmm] =11.6% to 17.4%. The isotactic broad, especially compared to polymers made with homogeneous metallocene based catalysts. The data in Table 12 support this observation, as the distribution for the polymer made with the Collette catalyst is 60, while those for the polymers made with the Chien catalyst or the catalyst of the present invention are less than 4.0. As described by Davey (U.S. Pat. No. 5,322,728) polymers with narrow molecular weight distributions have significant processing advantages, particularly for applications in the manufacture of fibers.

TABLE 12

Comparison of General Features of Elastomeric Polypropylenes

| Catalyst[a] | Method | Isotacticity [mmmm] | $M_w$ | $M_w/M_n$ | $T_m$ (° C.) | $\Delta H^f$ (cal/g) | XRD Cryst. (%) |
|---|---|---|---|---|---|---|---|
| Chien | C | 51.9 | 308,000 | 2.5 | 79 | 1.7 | 29 |
| Collette | C | – | 577,000 | 60 | 152 | 3.4 | 20 |
| A | C | 39.4 | 415,000 | 3.5 | 154 | 1.8 | 20 |
| D | D | 52.5 | 424,000 | 3.1 | 153 | 2.9 | 39 |
| E | C | 30.6 | 285,000 | 3.0 | 151 | 0.2 | 18 |

[a]For Catalyst A, see Example 2,
Catalyst D see Example 6;
Catalyst E see Example 7

Block Index similarly increases from <BI>=5.58 at 5 psig to <BI>=6.19 at 75 psig. As demonstrated by Examples 24–27, the productivity and average Mw also increase with increasing polypropylene pressure in the reactor. In addition, as demonstrated by Examples 47–50, polymerization of propylene with catalyst C of the present invention yields high molecular weight atactic polypropylene with isotactic pentad contents as low as 6–10%. Furthermore, as demonstrated by Example 43, polymerization of propylene with catalyst D of the present invention yield polypropylenes with isotactic pentad contents of up to 68% with higher values indicated.

Figure 3:
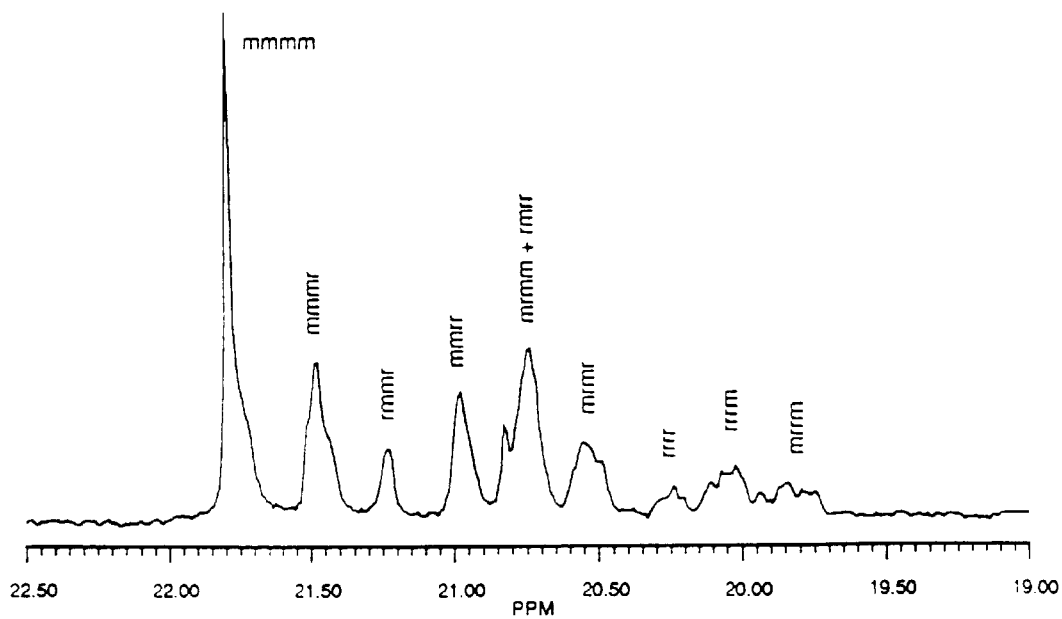
FIG. 3 is a representative $^{13}C$ NMR specimen of the methyl pentad region of a polypropylene prepared with catalyst A (Example 35)

FIG. 3 demonstrates an elastomeric polypropylene of this invention of isotactic pentad content [mmmm] of 28%, but at the same time very low syndiotactic content (the rr-centered triads on the right in the figure), as compared to typical prior art polypropylenes.

For comparative purposes, the structure and properties of the elastomeric polypropylenes of the present invention were compared against polypropylenes prepared with a bridged metallocene catalyst described by Chien (Macromolecules 1992, 25, 1242) and a heterogeneous catalyst as described by Collette (U.S. Pat. No. 4,335,225). These materials were evaluated under identical conditions and by the same analytical techniques employed in the study of the polymers of the present invention.

The polypropylenes of the present invention exhibit a range of industrially useful properties that are remarkable for a homopolymer. These polymers are homogeneous in composition, are of high molecular weight with low polydispersities, with $M_w$ between 50,000 and 1,800,000 easily being obtained, and have molecular weight distributions $M_w/M_n$ typically less than 5. By homogeneous in composition we mean that if the polymer can be fractionated by whatever solvent or solvent system(s), the different polymer fractions will still have similar molecular weight distributions, with $M_w/M_n$ typically less than 5.

The molecular weight distributions ($M_w/M_n$) of polymers made with heterogeneous catalysts are known to be quite The industrial processability of polymers for fiber and film applications is also a function of the molecular weight and melt flow rate of the polymer. It is well known that polymers with high molecular weights (low melt flow rates) are difficult to process and typically require post treatment with peroxide to increase the melt flow rate. This involves an extra processing step and can add significantly to the cost of the product. It is conventional to use hydrogen in many polymerization processes to control molecular weight during the reaction (Boor, "Ziegler-Natta Catalysts and Polymerization" AP NY 1979) and homogeneous metallocene catalysts are known to be quite sensitive to hydrogen. The catalysts of the present invention are quite sensitive to hydrogen. As shown in Table 13, addition of 0.17 mmol $H_2$ / mol propylene to a polymerization reaction utilizing bis [2-phenylindenyl]zirconium dichloride (catalyst A) of the present invention results in decrease in molecular weight corresponding to an increase in the melt flow rate from <0.1 dg/min to 25 dg/min. Similar behavior is observed for bis[2-(3,5-bis-trifluoromethylphenyl)indenyl]hafnium dichloride (Catalyst E). For comparison, hydrogen concentrations as high as 11 mmol $H_2$/mol propylene do not raise the melt flow rate of the Collette polypropylene above 0.1 dg/min. Clearly, the Collette polypropylene of U.S. Pat. No. 4,335,225 would require a postpolymerization treatment step for many applications, or would require use of economically unattractive or infeasible partial pressures of $H_2$.

TABLE 13

Influence of Hydrogen on the
Molecular Weight and Melt Flow Rate

| Catalyst[a] | Method | Hydrogen (mmol/mol C3) | $M_w$ | MFR (dg/min) |
|---|---|---|---|---|
| A | C | 0 | 415,000 | <0.1 |
| A | C | 0.085 | 255,000 | 6 |
| A | C | 0.12 | 173,000 | 13 |

TABLE 13-continued

Influence of Hydrogen on the
Molecular Weight and Melt Flow Rate

| Catalyst[a] | Method | Hydrogen (mmol/mol C3) | $M_w$ | MFR (dg/min) |
|---|---|---|---|---|
| A | C | 0.17 | 164,000 | 25 |
| E | C | 0 | 285,000 | 2 |
| E | C | 0.085 | 207,000 | 10 |
| E | C | 0.17 | — | 21 |
| E | C | 0.26 | — | 24 |
| Collette | C | 11 | 577,000 | <0.1 |

[a]For Catalyst A, see Example 2, Catalyst D see Example 6; Catalyst E see Example 7

The properties of elastomeric polypropylenes will depend on the percent of amorphous and crystalline domains within the sample, the length and distribution of atactic and isotactic stereosequences in the sample, and the size, shape and perfection of crystallites that provide the physical crosslinks in the material. Amorphous polypropylenes with no crystallinity will behave as gum elastomers while more highly crystalline stereoblock polypropylenes will behave as strong thermoplastic elastomers with significant tensile strengths. Analysis of the elastomeric polypropylenes of the present invention indicates the percent crystallinity ranges from samples that show no crystallinity by DSC (Catalyst C, Table 15) to samples with crystalline fractions of 39%, as determined by Wide Angle X-Ray diffraction (Table 12). For comparison, commercial isotactic polypropylenes have crystalline fractions of 60%.

Figure 5:
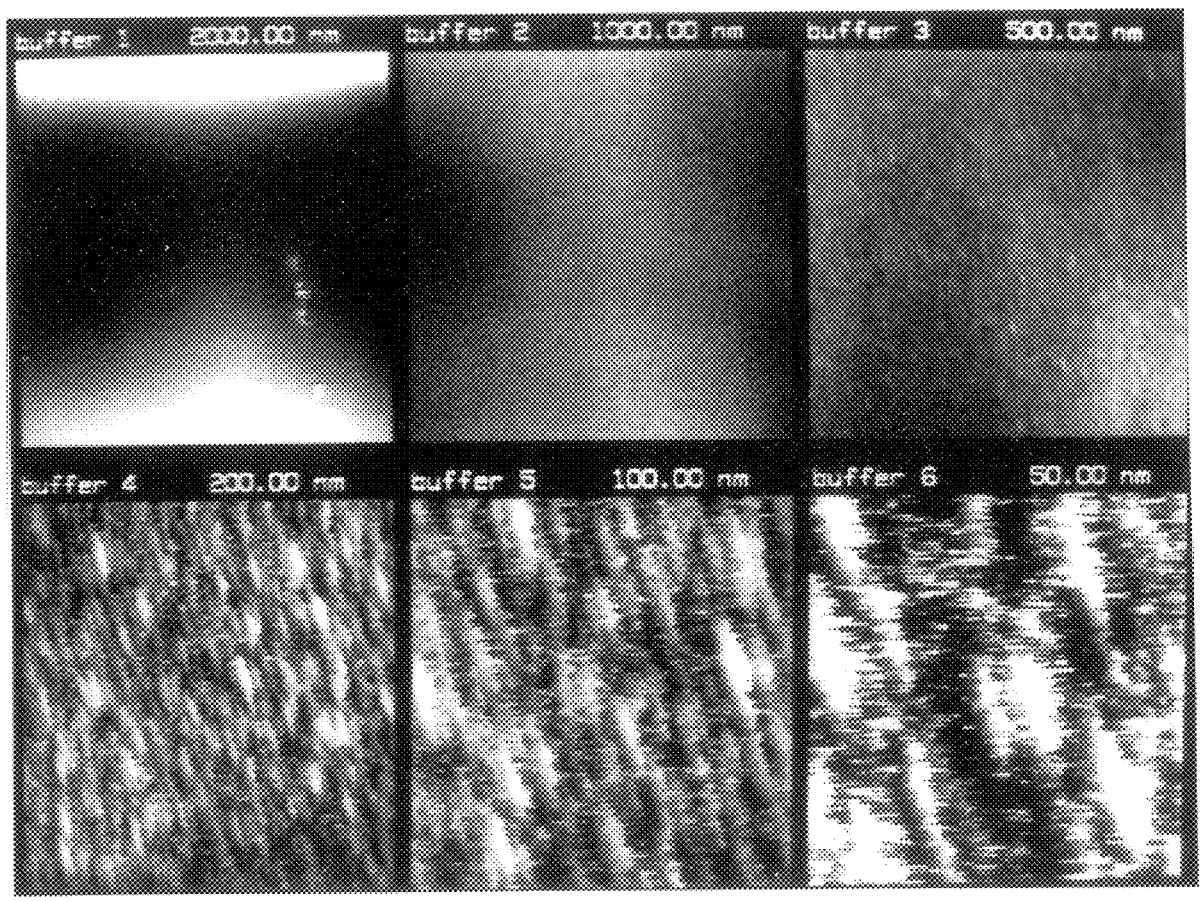
FIG. 5 is a Scanning Tunneling Microscope image of a polypropylene prepared with the Chien catalyst.
Figure 6:
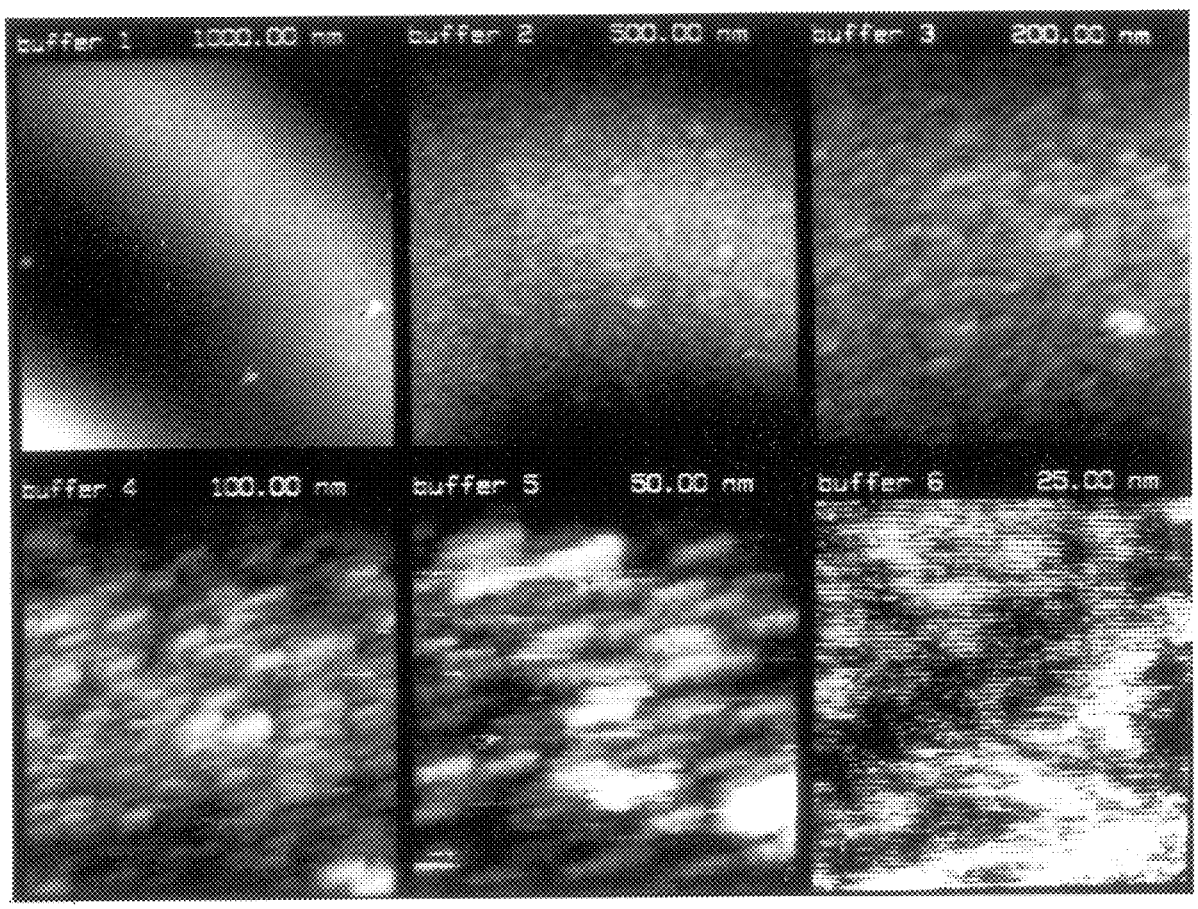
FIG. 6 is a Scanning Tunneling Microscope image of a polypropylene prepared with the Collette catalyst.
Figure 7:
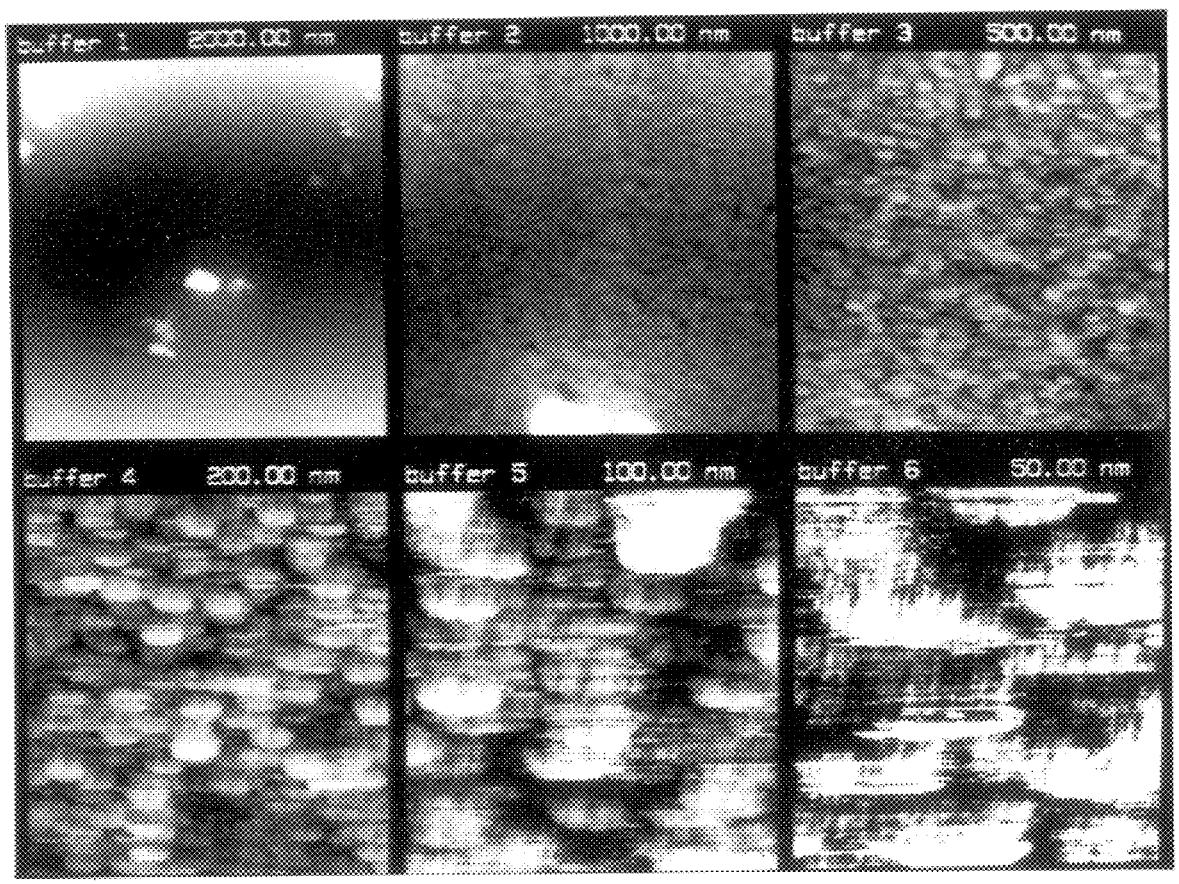
FIG. 7 is a Scanning Tunneling Microscope image of a polypropylene prepared with catalyst A (Method C) (2-phenylindene), of the present invention.
Figure 8:
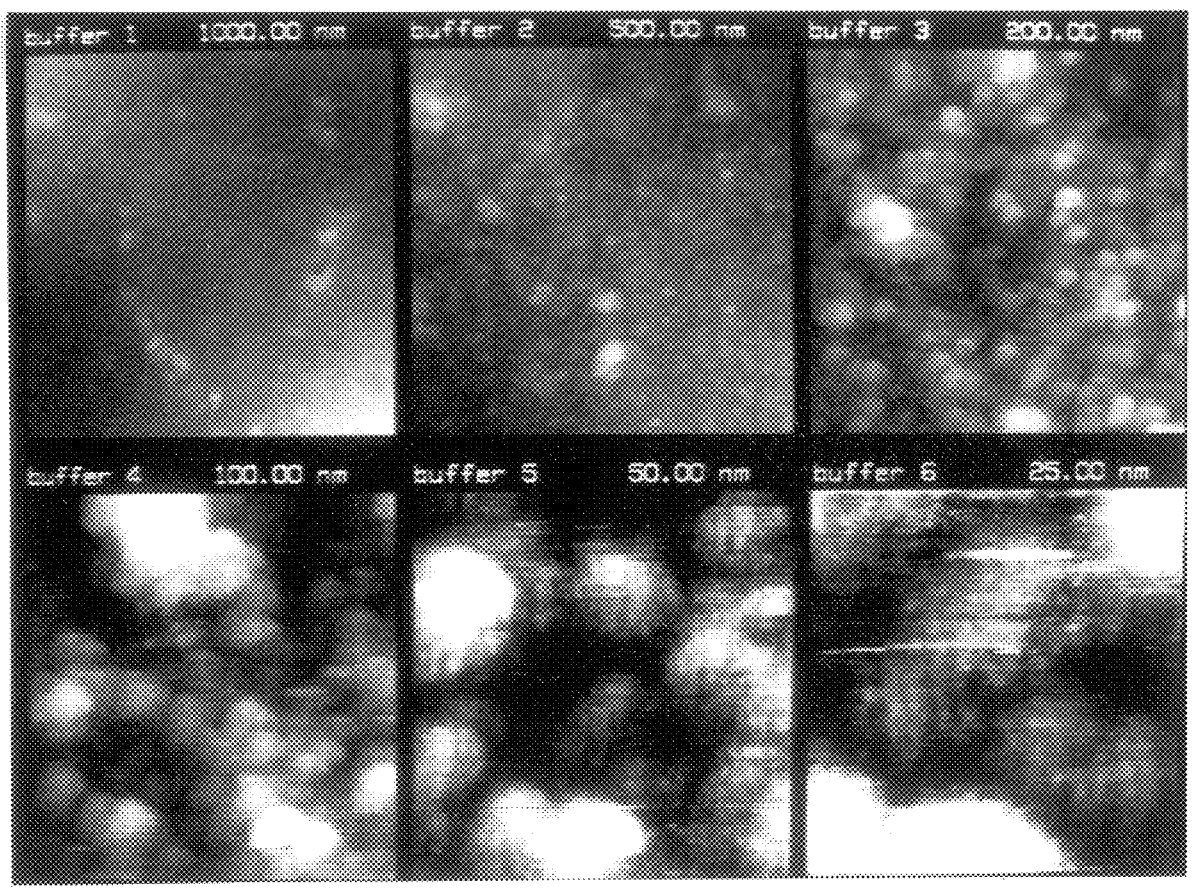
FIG. 8 is a Scanning Tunneling Microscope image of a polypropylene prepared with catalyst D (Method C), (bis-3, 5-TFM pherylindene), of the present invention.
Figure 9:
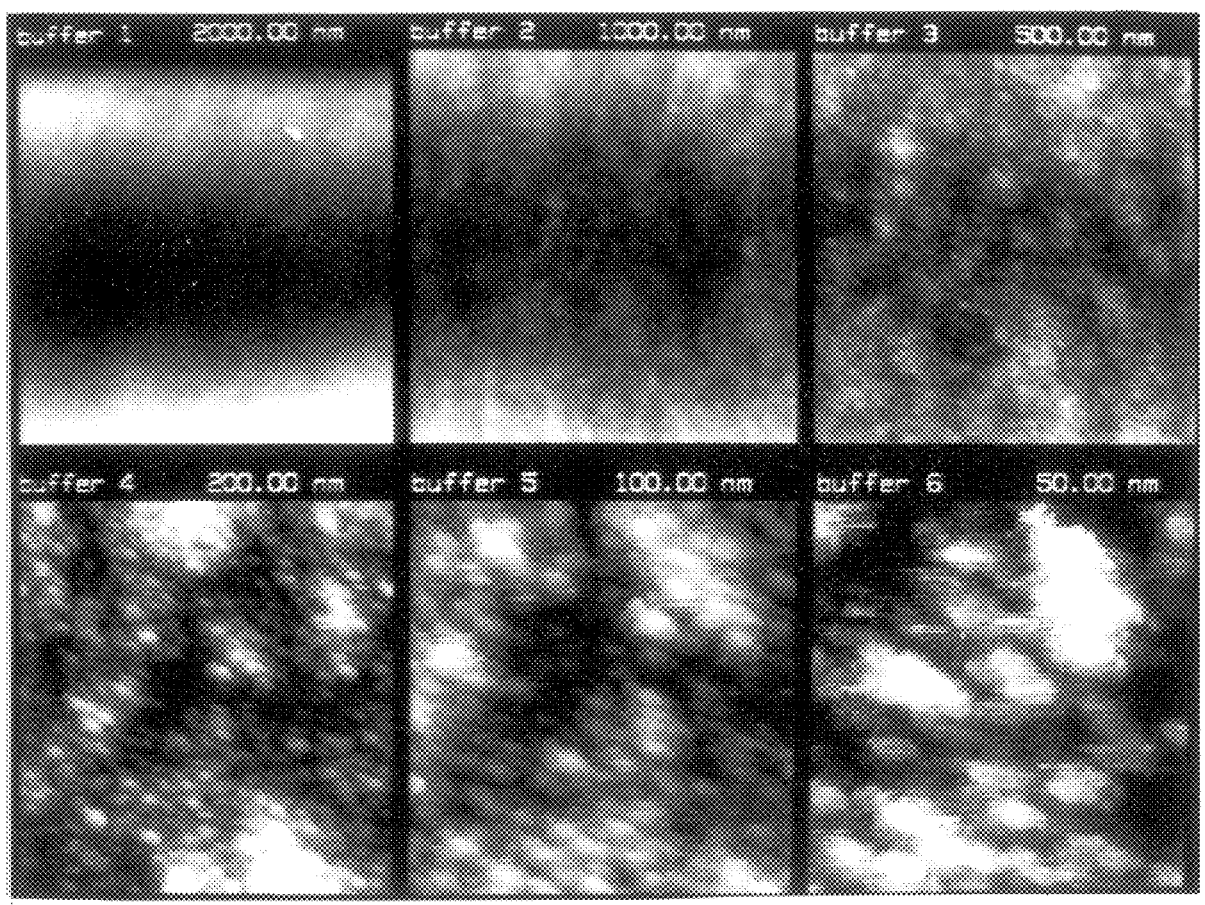
FIG. 9 is a Scanning Tunneling Microscope image of Hytrel™, a commercial polyether/polyester block copolymer.

Because Wide Angle X-ray analysis provides information on a bulk property averaged over the entire sample volume, Scanning Tunneling Microscopy (STM) analysis was carried out to provide information on the size and shape of ordered regions and the distribution cf crystallite sizes of various samples. STM images of the Chien polymer (FIG. 5) show a definite lack of extended order with domain sizes on the order of 5 nm×22 nm (Table 14). Some regions of order are present in the polymer prepared from the Collette catalyst (FIG. 6)) which exhibits a domain size of 3.5 nm×15 nm. Even greater order is observed with polymers of this invention in which definite extended regions of order are evident (FIGS. 7 and 8). As indicated in Table 14, the domain sizes for the polymer prepared from Catalyst A of the present invention is 7 nm×12 nm while that prepared from catalyst D has a domain size on the order of 11.4 nm×14.8 nm. The domain sizes of the polymers prepared from catalysts A and D are larger than those of the other polypropylenes examined. For comparison, the average domain size of the commercial polyether/polyester block copolymer, du Pont's Hytrel™, is 6.6 nm×13.6 nm (FIG. 9), very similar to that of the polypropylene obtained with Catalyst A of the present invention.

TABLE 14

Scanning Tunneling Microscopy Analysis

| Catalyst[a] | Method | Average Domain Size (nm) | Aspect Ratio |
|---|---|---|---|
| Chien | C | 4.8 × 22 | 0.22 |
| Du Pont | C | 3.5 × 15 | 0.23 |
| Hytrel ™ | purchased | 6.6 × 13.6 | 0.48 |

TABLE 14-continued

Scanning Tunneling Microscopy Analysis

| Catalyst[a] | Method | Average Domain Size (nm) | Aspect Ratio |
|---|---|---|---|
| A | C | 7.0 × 12 | 0.58 |
| D | D | 11.4 × 14.8 | 0.77 |

[a]For Catalyst A, See Example 2, Catalyst D see Example 6

The shapes of the ordered crystalline regions are also revealed in the STM analysis. The well defined striae evident in the photographic FIGS. 7 and 8 are distinctive of the polypropylenes of this invention. The aspect ratio is defined as the ratio of the short to the long dimension of an asymmetric feature. As shown in Table 14, the aspect ratio of the domains increases from values of 0.22 and 0.23 for the Chien and Collette polypropylenes to 0.58 and 0.77 for the polypropylenes produced with catalysts A and D, respectively, of the present invention. This suggests that the polypropylenes of the present invention possess more highly ordered crystalline phase morphologies than the propylenes of the prior art. The average aspect ratios of typical elastomeric stereoblock polypropylenes of this invention are above about 0.2 and preferably above about 0.3.

The upper service temperature of a thermoplastic elastomer is determined by the melting point of the polymer. The melting points of polypropylene are influenced by the size and perfection of the crystallites in the sample. The crystallites in turn can be influenced by the isotactic block lengths of the polypropylene chains. The catalysts of the present invention have the unexpected property of producing polypropylenes with a range of isotactic block lengths by proper choice of ligand/metal and process conditions. Thus, selection of catalyst and control of process parameters in accord with the teachings of the invention about results in production of polymers with a wide range of melting points, from amorphous polymers with no melt (catalyst C, Table 15) to polymers with melting points of 162° C. (catalyst D, Table 15). In contrast, the melting point of the Chien polypropylene is 79° C. (Table 12) even though it possesses a similar isotactic pentad content ([mmmm]=51.9%) to the polymer of the present invention prepared with catalyst D of this invention (melting point 153° C., [mmmm]=52.5%, Table 12). In contrast, the Chien polypropylene has an average domain profile of only 4.8×22 nm and an average aspect ratio of only about 0.22, while our catalyst D-produced polypropylene has a domain profile of 11.4×14.8 and an average aspect ratio of about 0.77. These show that the crystalline phase morphologies of the polymers of the present invention are distinctly different from Chien, in that they are more highly ordered than the Chien polypropylenes, resulting in higher melting points for the polymers of the present invention. The lower melting points of such Chien polypropylenes will in practice restrict their utility in many applications requiring higher temperature performance such as fibers and films. Likewise, the whole polymers of the Collette polypropylenes are reported to have melting points between 135–155° C., but are of high molecular weight with broad molecular weight distributions. Thus, the polymers of the present invention have a unique and useful combination of properties that include processability coupled with an unusually broad range of temperature performance.

TABLE 15

Melting Points of Polypropylenes of the Present Invention

| Catalyst | Method | Conditions | $T_m$(° C.) |
|---|---|---|---|
| C | B | Toluene, 50 psig, 20° C. | none |
| A | A | Toluene 0.5 psi, −25° C. | 52 |
| A | A | Toluene 0.5 psi, 0° C. | 79 |
| A | C | Bulk, −15° C. | 112 |
| D | C | Bulk, 0° C. | 144 |
| E | C | Bulk, 50° C., $H_2$ | 154 |
| A | C | Bulk, 23° C., $H_2$ | 157 |
| E | C | Bulk, 60° C. | 158 |
| D | C | Bulk, 0° C., $H_2$ | 162 |

The polypropylenes formed using catalysts of this invention are remarkably elastic. Typical isotactic polypropylene is characterized by a high initial modulus of up to 150,000 psi, a sharp yield at 20% elongation, tensile strengths of approximately 4,644 psi, and virtually no elastic recovery (tensile set=300%). In contrast, the polypropylene polymer of this invention made with catalyst A (Runs 1 and 2 in Table 7 above) has an initial modulus of 240 psi, exhibits no yield, a tensile strength of 500 psi and exhibits elastic recovery of over 90% (tensile set=30%). Ultimate elongations as high as 3000% for these polymers represent the highest reported values for a homopolymer of polypropylene. One of the unique features of this catalyst system is that the structure and therefore the properties of the polymer can be rationally controlled by parameters such as reaction temperature, monomer pressure and ligand substitutions. For example, polymers made with catalyst D (Example 39) exhibit initial modulus of 12,400 psi, no yield, tensile strengths of up to 5000 psi, and percent recovery of 34% (tensile set=197%), a remarkable and clearly unexpected degree of elastic recovery for a material with this tensile strength.

Figure 4:
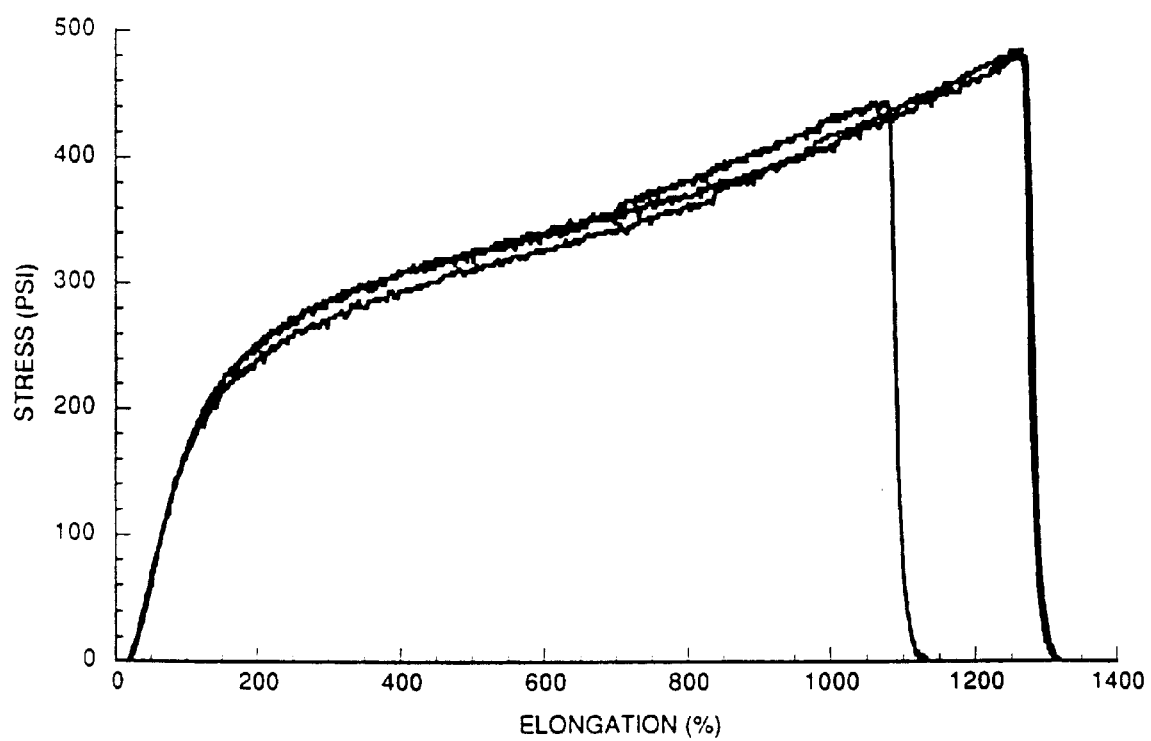
FIG. 4 is a representative stress-strain curve for a polypropylene obtained with catalysts of this invention (Example 23)

FIG. 4 is a stress strain curve for a representative elastomeric polypropylene of this invention (Example 23), having an isotactic pentad content of 16%. It exhibits no yield (no dip in the curve), a continuous increase in stress value with elongation out to 1300%. The tensile strength is 500 psi.

This cold-drawing behavior shown in Example 58 is the likely origin of the high tensile set exhibited in Example 57, run 3. After cold drawing, these very high strength elastomeric polypropylenes unexpectedly show excellent elastic recoveries. This shows that cold drawing can improve the elastic properties of these polymers and illustrates that the stereoblock polypropylenes of this invention easily form fibers and filaments having excellent properties for stretch fabrics, knit elastic wraps, bungee cord and the like utilities where strong elastomeric fibers with excellent durability and lifetimes are required.

It should be understood that various modifications within the scope of this invention can be made by one of ordinary skill in the art without departing from the spirit thereof. As one skilled in the art will recognize, by following the processes and procedures to thermoplastic elastomeric polymethylmethacrylate employing Zirconium or Samarium unbridged metallocene catalyst systems of this invention. This polymer may be used as a safety interlayer in auto glass in place of polybutyl polymers. We therefore wish our invention to be defined by the scope of the appended claims as broadly as the prior art will permit, and in view of the specification if need be.

We claim:

1. Alpha olefin polymers of homogenous composition comprising alternating isotactic and atactic diastereosequences, in which all polymer fractions have similar molecular weight distributions, $M_w/M_n$, of less than 7, an isotactic Block Index greater than about 5, an mmmm of above 9%, an average molecular weight, $M_w$, greater than about 20,000, a melting point of above 79° C. and which polymers are elastomeric in exhibiting a positive power of recovery for elongation above about 100%.

2. Alpha olefin polymers as in claim 1 which have a melting point above about 112° C.

3. Alpha olefin polymers as in claim 2 which exhibit low molecular weight distributions $M_w/M_n$, of below about 5.

4. Alpha olefin polymers as in claim 3 which are highly regioregular as evidenced by a substantial absence of 2,1 regioerror insertions.

5. Alpha olefin polymers as in claim 4 which exhibit an mmmm content in the range of from above 9 to about 71%.

6. Alpha olefin polymers as in claim 5 which are thermoplastic elastomers having mechanical properties of low tensile set of below about 70% at 300% elongation and high ultimate elongation in excess of about 960%.

7. Alpha olefin polymers as in claim 6 wherein said polymer is polypropylene.

8. Alpha olefin polymers as in claim 1 wherein said alpha olefin is selected from at least one linear or branched $C_3$–$C_{10}$ monomer.

9. Alpha olefin polymers as in claim 8 wherein said $C_3$–$C_{10}$ monomers are selected from propylene, 1-butene, 1-pentene, 4-methyl-1-pentene, and 1-hexene.

10. Alpha olefin polymers as in claim 9 wherein said polymer is polypropylene.

11. Thermoplastic elastomeric polypropylene as in claim 10 which has at least one of the following properties:

a) a low tensile set of below about 70% at 300% elongation; and
   b) a high ultimate elongation in excess of about 960%.

12. Thermoplastic elastomeric polypropylene as in claim 11 which has:

a) a Block Index in the range of from about 5–100; and
   b) at least one property selected from:
      i) an average molecular weight $M_w$ in the range of from 67,000 to 1,350,000;
      ii) said molecular weight distribution is in the range of from about 1.5 to 4.0;
      (iii) a melting point in the range of from about 125° C. to about 165° C.; and
      (iv) a high regioregularity as characterized by a substantial absence of 2,1 regioerror insertions.

13. Alpha olefin polymers as in claim 9 which include a minor amount of ethylene as a monomer.

14. A homogeneous alpha olefin polymer directly obtainable from a polymerization reaction of at least one alpha olefin monomer, said polymer comprising alternating isotactic and atactic blocks, having an isotactic pentad (mmmm) content greater than 9%, a molecular weight distribution, $M/M_n$, of between about 2.6 to about 7, a melting point of above about 50° C., an average molecular weight, $M_w$, greater than about 20,000, and which is elastomeric in exhibiting a positive power of recovery for elongation above about 100%.

15. A homogeneous alpha olefin polymer as in claim 14 wherein said monomer is selected from at least one linear or branched $C_3$–$C_{10}$ monomer.

16. A homogeneous alpha olefin polymer as in claim 15 wherein the isotactic pentad content is between 9% and 71%, and which are highly regioregular as evidenced by a substantial absence of 2,1 regioerror insertions.

17. A homogeneous alpha olefin polymer as in claim 15 wherein the melting point is above about 112° C.

18. A homogeneous alpha olefin polymer as in claim 15 wherein said positive power of recovery is exhibited for elongations above about 200%.

19. A homogeneous alpha olefin polymer as in claim 14 wherein said melting point in the range of from above about 112° C. to about 165° C.

20. A homogeneous alpha olefin polymer as in claim 19 wherein said alpha olefin monomers are selected from propylene, 1-butene, 1-pentene, 4-methyl-1-pentene, and 1-hexene.

21. A homogeneous alpha olefin polymer as in claim 20 wherein at least one of said alpha olefin monomers is propylene.

* * * * *